(12) United States Patent
Langston et al.

(10) Patent No.: US 6,871,893 B2
(45) Date of Patent: Mar. 29, 2005

(54) APPARATUS AND METHOD FOR CARRYING SIGNATURE BUNDLES

(75) Inventors: Macy Langston, Streamwood, IL (US); Wojciech Czubin, Rolling Meadows, IL (US)

(73) Assignee: Gammerler Corporation, Hanover Park, IL (US)

( * ) Notice: Subject to any disclaimer, the term of this patent is extended or adjusted under 35 U.S.C. 154(b) by 13 days.

(21) Appl. No.: 09/992,469

(22) Filed: Nov. 14, 2001

(65) Prior Publication Data

US 2003/0091420 A1 May 15, 2003

(51) Int. Cl.⁷ .................................................. B66C 1/44
(52) U.S. Cl. ................ 294/113; 294/119.1; 414/792.9; 414/796; 414/796.9
(58) Field of Search .............................. 294/103.1, 104, 294/106, 113, 119.1; 414/792.9, 796, 796.9

(56) References Cited

U.S. PATENT DOCUMENTS

| | | | |
|---|---|---|---|
| 3,614,151 A | * | 10/1971 | Shadle ........................ 294/104 |
| 4,247,092 A | | 1/1981 | Dwyer |
| 4,256,429 A | | 3/1981 | Dwyer |
| 4,383,788 A | | 5/1983 | Sylvander |
| 4,746,255 A | | 5/1988 | Roccabianca et al. |
| 5,087,169 A | | 2/1992 | Tübke |
| 5,582,504 A | | 12/1996 | Cestonaro |
| 6,129,504 A | | 10/2000 | Gämmerler et al. |

FOREIGN PATENT DOCUMENTS

EP  0 133 945 A1  3/1985

* cited by examiner

Primary Examiner—Janice L. Krizek
(74) Attorney, Agent, or Firm—Fitch, Even, Tabin & Flannery

(57) ABSTRACT

An apparatus and method for carrying signature bundles are provided that allow for many different sizes of bundles to be handled and manipulated in an easy and very agile fashion for low cycle times and for being deposited in various pallet patterns. The apparatus can include several units adjustably mounted relative to each other with each having bundle gripping members that can likewise be adjusted for varying signature formats. The upper clamp head gripping member preferably has a universal mount so that it self-adjusts to pivot for staying in flush engagement with sloped bundles. The units have a very thin housing to allow an operator to gain a good view of the bundles carried in front thereof. The units preferably include pulley drive systems provided with drive ratios to keep the housing size to a minimum while allowing a large advancing stroke for the gripping members for handling of different sized bundles. A load balancing system is preferably employed that allows the operator to manipulate the apparatus as if it were weightless whether unloaded or loaded with one or more bundles. The load balancing system can provide a variable lifting force with the lifting force being automatically changed depending on the loading of the apparatus to keep it weightless so that the apparatus glides when the operator exerts directional and acceleration/deceleration forces as by pushing or pulling on the apparatus.

18 Claims, 25 Drawing Sheets

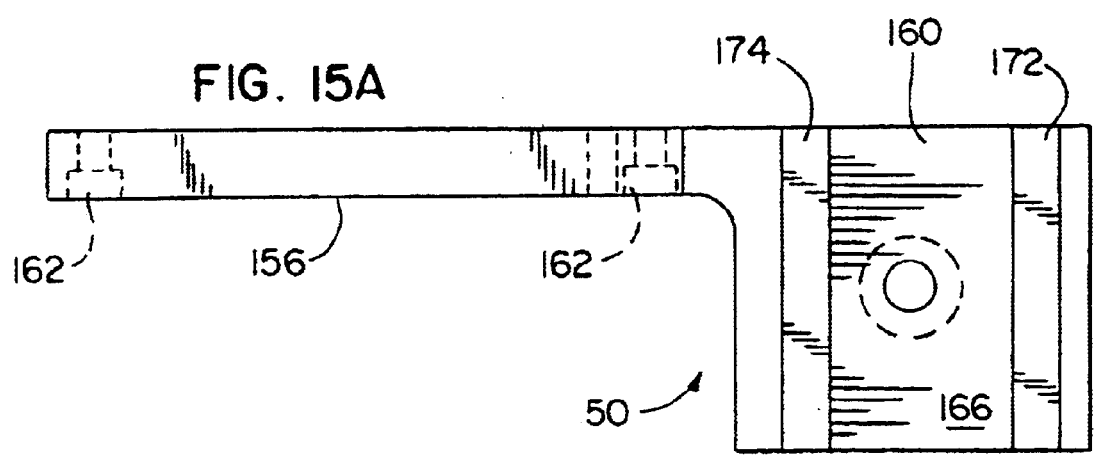
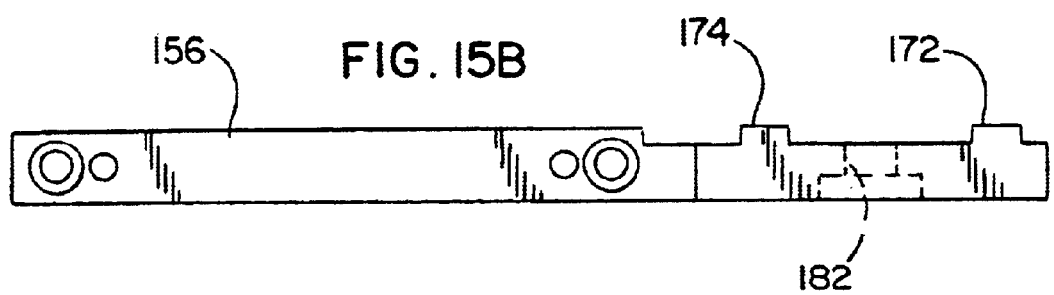
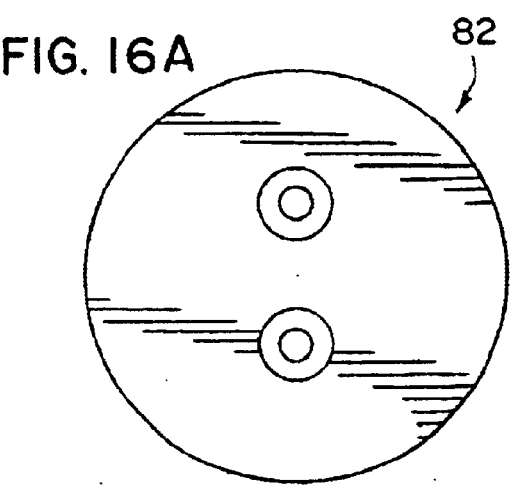
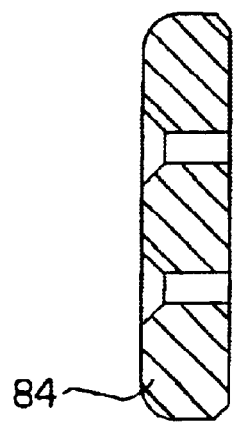

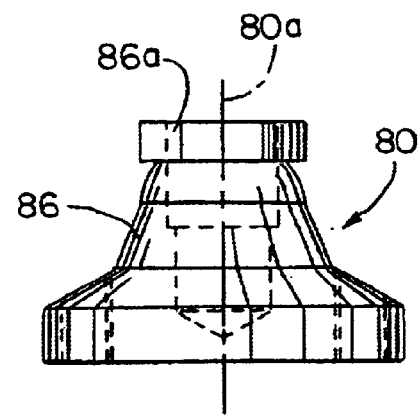
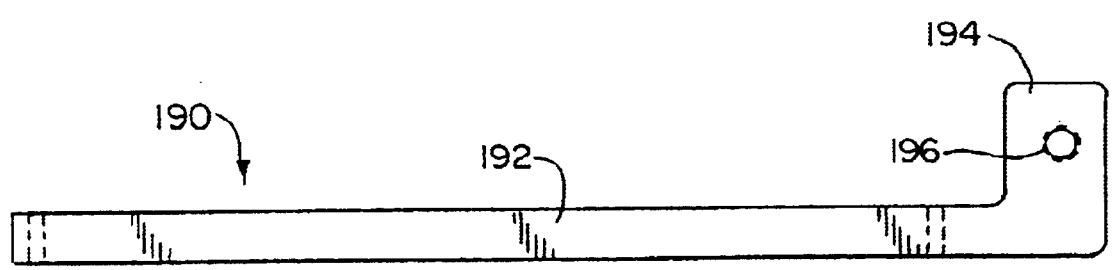
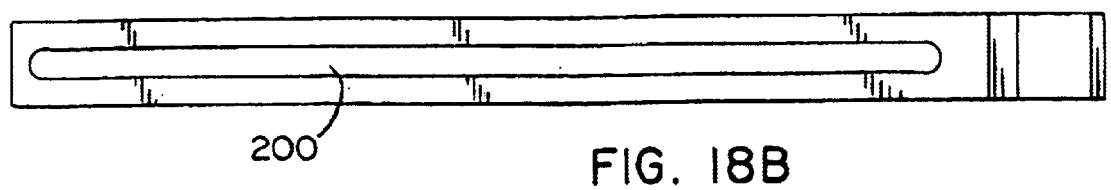

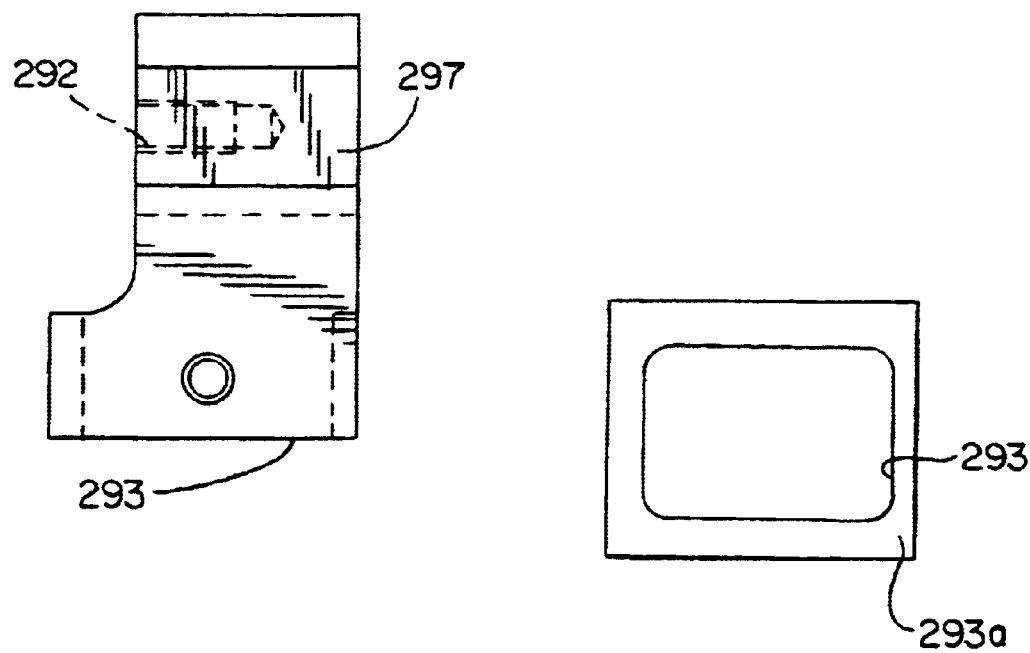
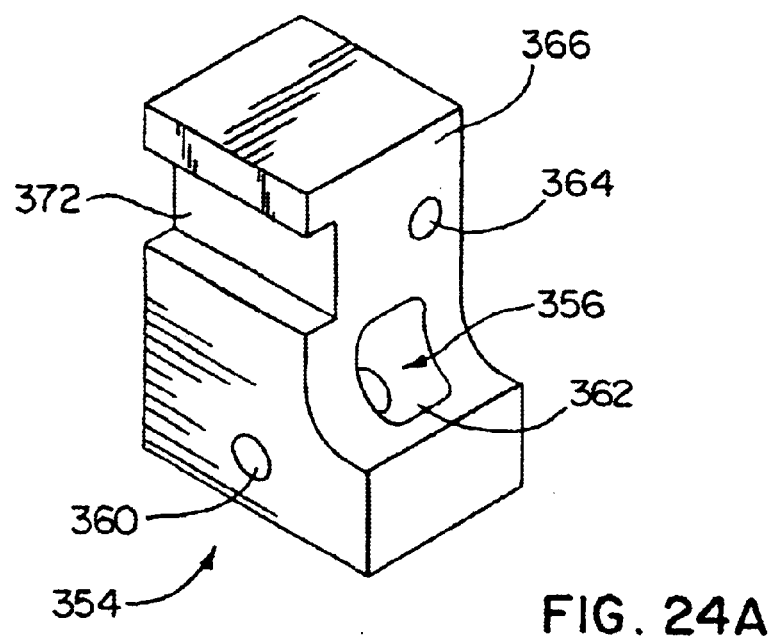

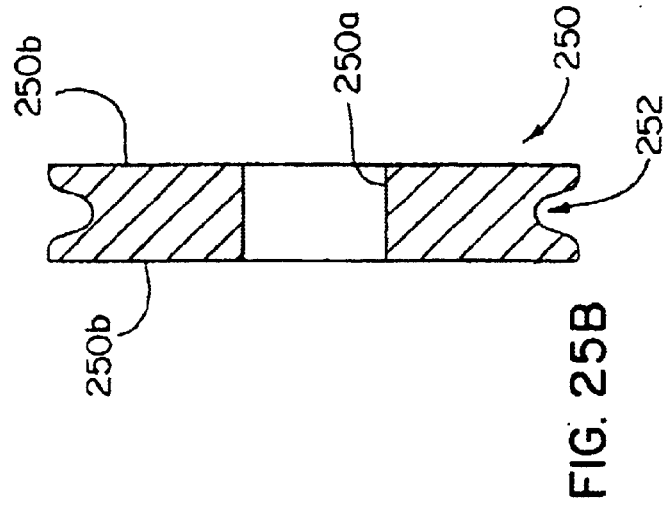
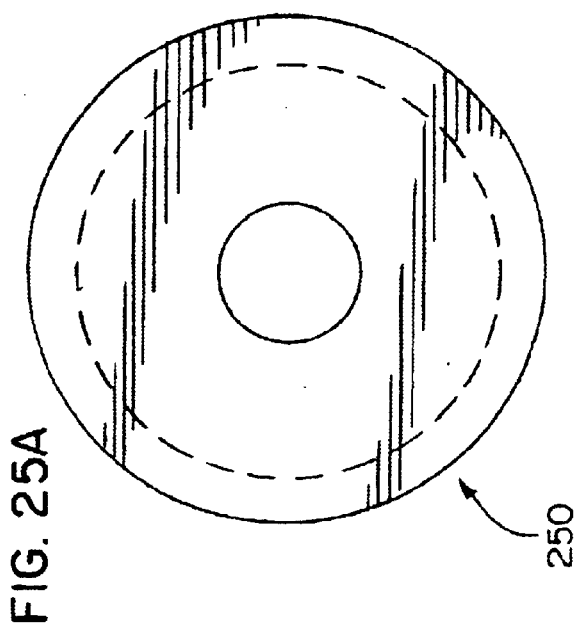
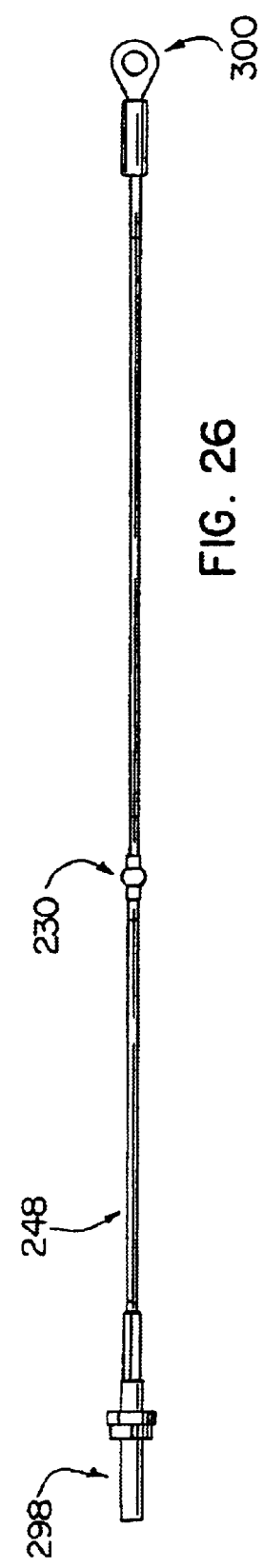

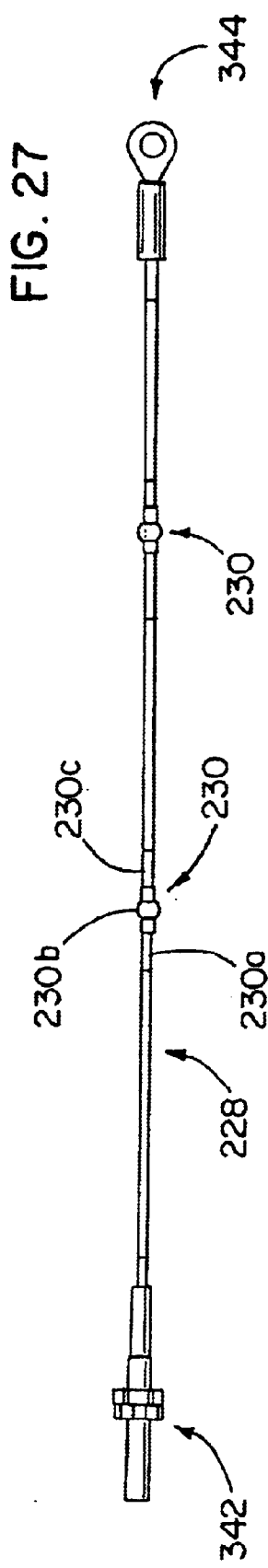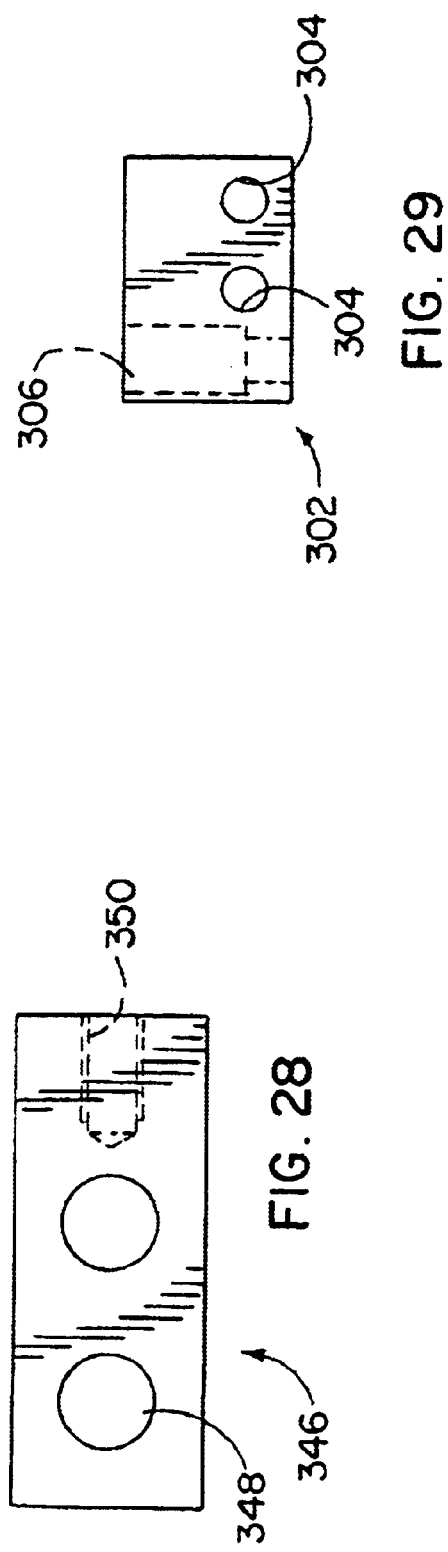

APPARATUS AND METHOD FOR CARRYING SIGNATURE BUNDLES

FIELD OF THE INVENTION

The invention generally relates to an apparatus and method for carrying bundles of signatures and the like and, more particularly, to a gripping apparatus and method for palletizing bundles of various configurations.

BACKGROUND OF THE INVENTION

Currently, palletizing bundles is typically done either manually or by automated robotic systems using bundle gripper heads or end effectors attached to manipulator arms. Manual palletizing is undesirable in several respects. At a minimum, one person is required for each stacker and/or pick-up location, and where multiple stackers or pick-up locations are present overhead costs can become a significant detriment to system profitability. With speeds of printing presses continuing to increase, e.g. up to 110,000 signatures/hour, manual palletizing can present a formidable obstacle to the maintenance of high throughput post press while keeping the number of laborers to a minimum. In some instances, reduced throughput is simply not acceptable when the printed material is time sensitive such as with most advertising material.

The laborers in these jobs tend to be lower skilled and thus are more likely to damage products when grabbing a bundle from its pick-up location, carrying it to the pallet, and properly locating the bundle on the pallet. Low skilled laborers are also generally lower wage earners so that there typically is greater turnover rates in these jobs increasing expenses associated with low retention rates such as hiring and training costs and the like. Further, where there is manual labor involved, injuries that limit the worker' ability to perform their job can create lost productivity further eroding profits.

Power assisted devices or bundle gripping heads to enable workers to lift and transport bundles for being palletized have been attempted. However, they generally have not realized their full potential because of the difficulty workers have in maneuvering the devices, particularly when raising or lowering these devices while carrying bundles.

Automated gripping heads used with robot arms are generally faster and do not present many of the problems set forth above that more manual systems can create. These automated heads tend to be very expensive from both a cost of purchase and cost to maintain standpoint. One significant drawback in their use is that the gripping or grasper heads tend to be limited in terms of the variations in product format or size they can handle. Specifically, the supports or fork members they use to pick-up the bundles are usually fixed in their length and/or in their relative lateral position with respect to each other. This creates problems with customers who are dealing with wide variations in product format, particularly in the low-end market including such things as "junk" mail and cards for CD cases and the high-end gravure market including tabloids as well as other uncommon signature formats.

For these customers, the fixed fork grasper units have to have their fork members sized to the smallest width and length format product to be handled so that the form members do not project out from underneath the bundles being lifted, transported and palletized. Projecting forks can create a safety hazard and make it extremely difficult to place the bundles on the pallet without damaging or marking bundles already present on the pallet.

The product format will in large part determine the pattern of the bundles as placed on a given sized pallet to ensure a stable stacking of the bundles on the pallet. For instance, due to the presence of spines that can create an uneven build-up of signatures in a bundle, there can be a sloped upper surface on the bundles. Stacks of such bundles one on top of the other with signature spines aligned will cause a cumulative build-up of sloped signatures with the slope becoming more pronounced with each bundle. To address this problem, the bundles are patterned to be blocked in against each other in a layer of bundles on the pallet so that adjacent bundles will tend to resist any shifting of signatures disposed toward the top of the sloped bundles. Furthermore, the bundles particularly at a corner in a layer of bundles may not be oriented with their length or width running in the same direction as the adjacent bundles due to the product format relative to the pallet size. It is also true that adjacent layers of bundles on the pallets may be arranged differently for stability purposes.

In sum, it is important that the automated gripper units be flexible and agile enough to accommodate the differing product and pallet sizes and the various patterns in which the bundles are to be deposited on the pallets. Of course, having fork members that project beyond the bundle significantly impairs the maneuvability necessary to be able to place bundles down in tight fitting patterns on pallets such as where they are to be in blocking relation with other bundles without engaging and damaging these bundles on the pallet.

On the other hand, having the fork members sized to the smallest product format to avoid the projecting fork problem described above creates significant disadvantages when larger sizes of products are to be palletized. In this instance, the signatures, if wider than the laterally spaced forks will hang over the sides of the forks, and if longer than the length of the forks will hang over the ends creating a drooping condition of the bundle during transport and deposit onto the pallet. Drooping bundles make it more likely that portions hanging over the sides or ends of the bundle supports will catch when being deposited folding over and damaging these hanging bundle portions. Furthermore, with these oversized bundles relative to the fixed forks and where the drop-off level for the bundle is higher than the pick-up level, there is a need for raising the bundles higher than otherwise would be necessary to clear the surface on which the bundle is to be deposited, be it the top of a lower bundle or the pallet itself. With automated robotic systems, the extra raising of the bundle gripper needs to be programmed into the software controlling the movements of the robot arm. As is apparent, the extra time required of the robot arm to execute its movement to raise the drooping bundles to a clearance level so they do not engage other bundles on the pallet undesirably increases cycle time.

There have been bundle gripping units that have generally proposed incorporating format adjustment capabilities although these capabilities generally have not been optimized from an ease of use or implementation standpoint, see U.S. Pat. No. 6,129,504, commonly assigned to the assignee herein. However, this and other such units still suffer from the shortcoming that they only pick-up, transport and deposit one bundle at a time. While these units are generally fast enough to handle bundles from a single signature stacker to be deposited on a single pallet, they can compromise cycles times in other layouts such as where there are multiple stackers and/or pallets from which bundles are to be picked-up and on which they are to be deposited, respectively.

The sloping upper surface of bundles also can lead to problems with many grippers that employ rigid bars or clamp members to engage and push signatures down for clamping the bundles against the supports or forks thereunder. Because of the slope of the bundles, and the rigidity of the clamping members or bars, when the bars are brought down into engagement with the top of the bundle, they will first engage the higher portion of the top of the bundle and start to push it down before engaging against the lower portions fo the bundle top. Since the rigid clamp members are pushing down on only the raised top portion of the bundle prior to engagement with the more lower portions, the signatures in the bundle will tend to want to slide or "squirt" out of the bundle stack by shifting in the direction of the non-engaged bundle portions or downslope. This is especially true where the signatures include coatings with slip agents such as silicon and wax materials incorporated to minimize ink rub-off problems in the bundle. Thus, the prior bundle grasper disclosed in the '504 patent needed to constrain the bundle from lateral shifting upon clamping via the use of surrounding guides along all four sides of the bundle.

Accordingly, there is a need for an operator controlled bundle transport system and method using a bundle carrier that allows the operator to easily maneuver the bundle in a manner that is highly responsive to operator control. A further need exists for a gripping apparatus and method that provides improved flexibility in handling of different product formats. Further, it is desirable for such an apparatus to allow for stable palletizing of the bundles while at the same time achieving improved cycle times relative to those achieved with prior bundle gripper units. A bundle gripping apparatus that is easy to use would also be desirable.

SUMMARY OF THE INVENTION

In accordance with the present invention, a bundle carrying system and method are provided that enable an operator to ergonomically control movements of a bundle carrier or gripper head in a highly responsive manner. The present bundle carrying system and method are such that when an operator exerts directional, braking and/or acceleration forces on the carrier, the carrier provides substantially instantaneous response and moves accordingly despite the large weights it may be carrying and the inertia it may have developed.

In another aspect of the intention, a bundle gripping apparatus and method are provided to allow for a wide range of product or signature formats to be handled. Accordingly, bundles of various configurations can be securely picked up and transported to a pallet. The apparatus also is sufficiently agile so that it can be easily and quickly maneuvered for depositing bundles in a wide variety of prescribed patterns for pallet stability. The apparatus herein preferably includes multiple bundle gripping units with gripping members having a large degree of adjustability that is accomplished in a relatively easy and user-friendly manner. For this purpose, the gripping units of the apparatus can be mounted to an elongate member to be adjustable relative to each other for handling different product formats as well as allowing for multiple bundles to be carried simultaneously by the gripping apparatus.

For example, two large bundles can be carried by four units adjusted appropriately along the elongate member of the apparatus with two units securely gripping each bundle. Thus, the apparatus is extremely flexible as not only can it readily handle different sized bundles, it can simultaneously carry multiple bundles. In this manner, it can provide reduced cycle times by this ability to simultaneously carry and deposit multiple bundles, or alternatively by allowing a single bundle to be placed at one deposit location on a pallet while maintaining custody of the other bundle, and then independently depositing the other bundle at another deposit location on the pallet or on another pallet.

The gripping apparatus is also adapted for more direct operator control via a valving circuit that provides ease of maneuverability of the apparatus regardless of the size, weight, or number of bundles it is carrying. In one form, the apparatus can be configured to pick-up bundles of the same format at one pick-up location, and after their deposit, can switch to another configuration enabling it to pick-up bundles from another pick-up location which are differently formatted than the first set of bundles that were palletized.

In a preferred form, the present apparatus includes multiple bundle gripping units each having supporting and clamping members that can be brought into supporting and clamping engagement with a bundle for transport thereof. The gripping units are adjustably mounted to an elongate member or rail to allow, for example, a pair of the units to optimize the position of their support and clamping members for engagement with a single bundle. In other words, should the bundle have a lengthwise dimension that is relatively short, either a single gripping unit can be utilized, or a pair of gripping units can be brought closer together to support the bundle at either end thereof. Alternatively, if the bundle is longer, the gripping units can be adjusted so that they are spaced further from each other to properly support the longer bundle for transport. In this manner, the present apparatus is well-adapted for handling various configurations of bundles.

In this regard, the bundles will normally be oriented with their lengthwise dimension running parallel to the length of the elongate rail along which the units are adjusted; however, it should also be noted the flexibility for handling different product formats of the present apparatus does not depend on whether the orientation of the bundles is varied such as if the widthwise dimension of the bundle is oriented parallel to the elongate rail although the invention is described herein with the bundles in their typical orientation with their length parallel to the elongate rail.

It is preferred that the unit gripping members include a lower support or fork member and an upper clamp member with each having a retracted position and an advanced position for gripping and supporting the bundles. The extended positions of the fork and clamp member can also be adjusted to accommodate varying width signature bundles. With respect to the fork members, this allows the units to avoid the need to be sized to the smallest bundle as is necessary with fixed format prior bundle grippers. In this manner, the present apparatus does not create the risk of damaging product or detract from low cycle times by having the bundles drooping or hanging too far over the support fork members that otherwise would necessitate the extra time to raise the bundles to a clearance level above the bundles or pallet unto which they are to be placed. In addition, the extended position of the upper clamp member can also be adjusted so that it engages the bundle closer to an intermediate position along the width thereof for centered clamping therewith.

For the above purpose, the units include adjustment controls that allow the extended positions to be selected according to the configuration of the bundle to be handled. Thus, with smaller sized signature bundles in the widthwise direction, the members can be adjusted so that in their extended positions they will be disposed closer to the housing, and for larger sized signature bundles in their widthwise dimension, the members will be adjusted to be further from the housing. Accordingly, the adjustability of the lower support members allows the distance that the bundles project beyond the ends thereof to be minimized, and provides for a more centered clamping action by the upper clamp member.

As previously described, the apparatus herein can be utilized to pick-up and carry multiple bundles simultaneously to further enhance cycle times during palletizing operations therewith. The apparatus can include an automated robot arm that under software control shifts the gripping units to bundle pick-up locations, actuates the gripping members of the units and carries the clamped bundles to the pallet at which they are to be deposited. As is apparent, this operation provides for very low cycle times and removes the disadvantages associated with manual labor, as earlier discussed.

In addition, the apparatus preferably is provided with a handle assembly and operator controls that can be associated therewith so that an operator can maneuver the apparatus to the pick-up and deposit locations, as necessary. To enable the apparatus to be more effectively utilized, the housings for each of the units is constructed to have a very narrow width extending in the direction of the length of the elongate rail member. This maximizes an operators view as they manipulate the apparatus to properly position the fork members under the bundles at the pick-up location, and then transport the bundles and manipulate them into proper position for deposit at the pallet. Accordingly, as the operator brings the apparatus to the bundle pick-up location, they can obtain a good view of the bundles around and/or between the housings of the bundle gripping units to orient the forks under the bundles to be picked-up. Similarly, as they approach the pallet at which the bundles are to be deposited, they can likewise more readily see the bundles around the housings or with a line of sight between the housings to orient them properly for deposit at the pallet.

In one form, the apparatus includes two pairs of the bundle gripping units whose operation is independent from each other. In this way, an operator can pick-up two bundles, one with each pair of gripping units and carry them simultaneously toward their pallet(s). Due to the independent operation of the units, where the bundles are deposited at the same pallet, they do not need to be deposited in the side-by-side orientation in which they are carried. In other words, one of the bundles carried by one of the pairs of gripping units can be deposited at one location on the pallet while the other pair of gripping units maintains custody over the other bundle. Thereafter, the other bundle can be deposited at some other location at the pallet spaced from the first deposited bundle by other bundles and/or with a different orientation than that of the first deposited bundle. As previously discussed, the units are constructed so that the housings are generally very narrow. Accordingly, the bundles will extend laterally beyond the narrow housing so that the housing will not interfere with tight placement of the bundles on the pallet closely adjacent to or engaged with other bundles thereon. This agility of the apparatus is particularly important to customers that employ a wide range of bundle patterns on their pallets. In this manner, the present apparatus provides a user significant flexibility in palletizing the bundles in allowing for the best pattern of bundles on a given size pallet to be utilized for providing the most secure arrangement of bundles thereon.

To enable the operators to easily maneuver the apparatus as attached to the manipulator arm, a load-balancing system can be employed to allow an operator to set the apparatus for a particular job where bundles are consistently sized so that as the apparatus is maneuvered and raised and lowered during pick-up and deposit operations, the apparatus will feel essentially "weightless" to the operator. An operator need not be continually depressing a button or switch to energize a motor for moving the apparatus which undesirably keeps their hand in a substantially static location on the handles of the apparatus as it is being maneuvered, and need not utilize a speed control for the motor to speed it up such as for covering larger movement distances or slow it down as may be needed closer to the pallet. This makes the apparatus herein much easier to user than prior bundle gripping units increasing productivity and thus decreasing cycle times accordingly. Further, the movement of the apparatus is highly responsive to the manual control exerted thereover to allow the operator to make quick, on-the-fly precision adjustments to the movements of the apparatus including the direction, speed, and acceleration/deceleration thereof.

While the load balancing system described herein is currently preferred from a cost standpoint, it is also possible for the system to utilize manually operated controls that sense user-applied forces as by transducers of the apparatus and generate signals that control precision directional shifting of the apparatus via variable speed motors or servo motors so as to be highly responsive to the sensed applied forces. As the sensed force increases, the motor speed is increased. Likewise, as the force applied is lowered, the motors will slow down. Further, the direction of the applied force is also detected to govern operation of the motors to generate the desired directional movement accordingly. Position feed-back mechanisms and sensors can also be used so that the position of the bundle carrier is precision controlled.

In the preferred form where the apparatus is used to pick-up two bundles simultaneously, the load-balancing system employs a pneumatic valving circuit and a bundle detect switch. There is an initial setup stage where the operator sets regulators for a lift cylinder to their desired level for three different modes of operation. There is an initial adjustment before the bundles are picked up, an adjustment for when there are two bundles being carried by the apparatus, and a final adjustment when only one bundle is being carried by the apparatus. At each of these adjustment intervals, the operator adjusts a respective regulator so that the weight of the apparatus is tailored to what the operator is comfortable with. To allow the apparatus to handle bundles of different weights such as output from two different simultaneously running stackers, the valving circuit can include an additional set of regulators dedicated to the additional stacker and a manually operated valve to allow the operator to select the regulator set that is to be operable when setting up the regulators for the bundles to be handled and thereafter as the apparatus is used to carry first bundles from one stacker and then bundles from the other, and for switching back and forth as necessary. The preferred valving system herein is configured based on the pick-up of two bundles at the same time, although it will be recognized that other configurations for the valving system are possible such as when more or less than two bundles are picked-up.

Another advantageous feature of the present invention is provided at the upper clamping member in the form of a pivotal clamp head. The pivotal clamp head herein is well adapted to transmit the clamping forces to the bundles, particularly where the bundles have an uneven buildup of signatures so that there is a slope built-up toward the upper end of the bundle stack. The pivotal clamping head is provided with a range of pivotal motion sufficient to accommodate for sloped upper surfaces of the bundles of up to approximately sixty-degrees from the horizontal.

The clamp head preferably has a small disk shape and when brought down into engagement with the sloped upper surface of the bundle pivots so as to stay in flush engagement with the bundle. In this way, the downward clamping force is better distributed across the bundle upper surface than with the prior rigid clamping bars that only engaged the higher portion of the sloped bundle upper surface with the remainder of the clamping bar spaced from the lower portions of the bundle upper surface. Further, as the clamp head pivots to the configuration of the sloped bundle, the downward clamping force will be translated to include a component generally directed back toward the higher or raised portions of the bundle. Accordingly, the gripping action provided by the present apparatus including the pivotal clamp heads herein provides a secure grip of the bundles and maintains them in their desired configuration for transport and palletizing.

BRIEF DESCRIPTION OF THE FIGURES

FIGS. 15A and 15B are elevational views of the other hanger member of the gripping unit;

FIG. 16A is a bottom plan view of an engagement pad of the clamp head;

FIG. 16B is a cross-sectional view taken along line A—A of FIG. 16A showing throughbores in the pad;

FIG. 17A is a plan view of a universal pivot mount for the pad of the clamp head;

FIG. 17B is a side elevational view of the pivot mount of FIG. 17A;

FIGS. 18A and 18B are elevational views of an adjustable slide bar for the clamp head showing an elongate slot for adjusting the extended position of the clamp head;

FIGS. 23A–23D are various views of a pulley carriage for rotatably mounting pulleys about which a drive cable extends for the drive system of the upper clamp member;

FIGS. 24A–24D are various views of a pulley carriage in which pulleys are rotatably mounted and about which the cable extends for the drive system of the lower fork member;

FIG. 25A is an elevational view of one of the pulleys used with the drive systems;

FIG. 25B is a cross-sectional view taken along line A—A of FIG. 25A;

FIGS. 26 and 27 are elevational views of the cables used in the drive systems for the upper clamp member and lower fork member, respectively, showing threaded plugs at one end and connector eyes at the other end of the cables;

FIG. 28 is an elevational view of an attachment block to which the connector eye end of the fork member cable is fixed;

FIG. 29 is an elevational view of an attachment block to which the connector end of the clamp member cable is fixed;

DETAILED DESCRIPTION OF THE PREFERRED EMBODIMENTS

Figure 1:
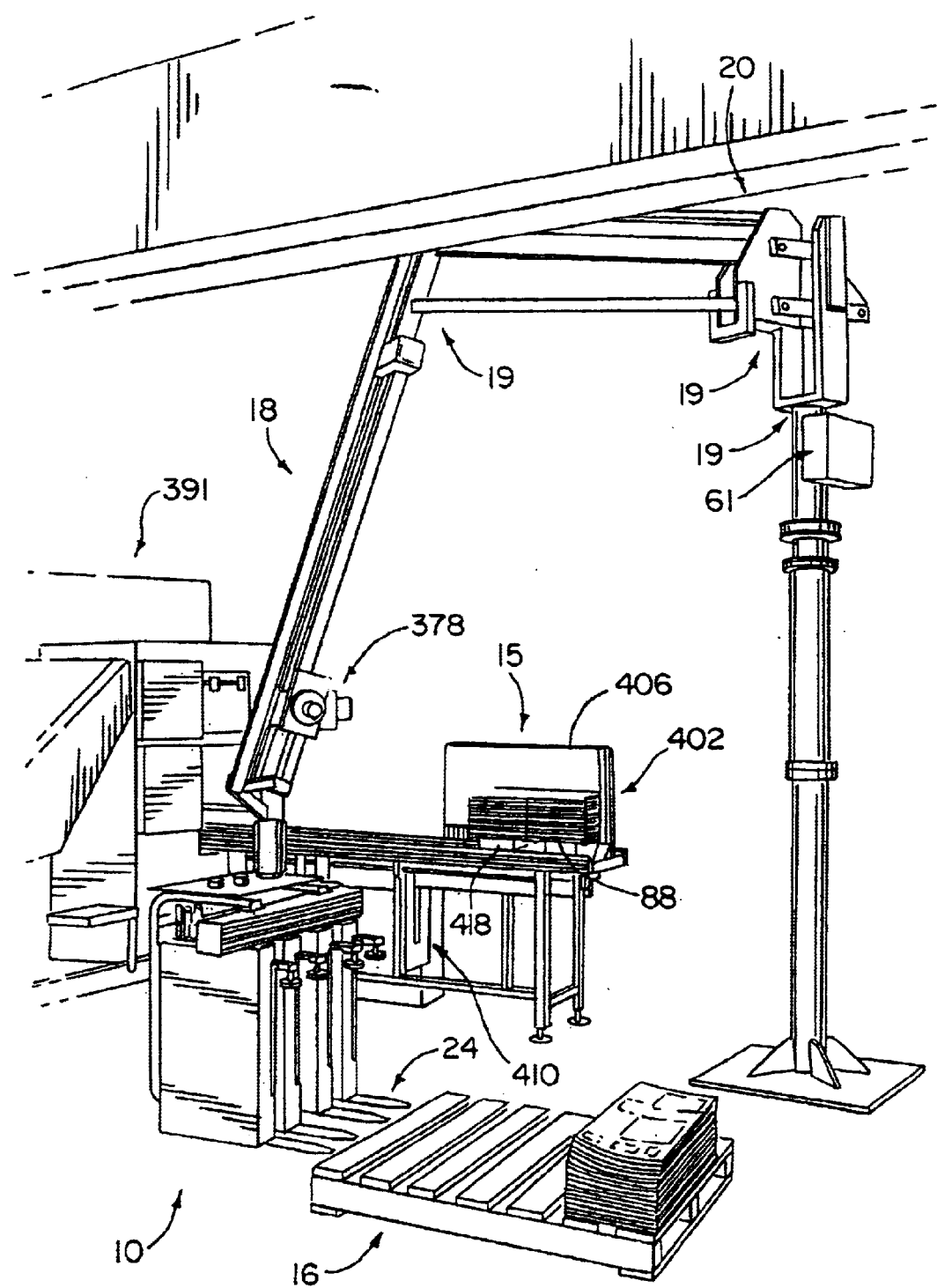
FIG. 1 is a view of the bundle gripping apparatus in accordance with the present invention showing an elongate rail member and a plurality of gripping units with the apparatus attached to a manipulator arm and the units having upper and lower gripping members for picking up and carrying bundles and depositing them on a pallet.

In FIGS. 1–4, a bundle gripping apparatus 10 in accordance with the present invention is shown in its preferred environment of use for taking bundles 12 of signatures 14 from a pick-up location 15 and transferring them to a deposit location, such as a pallet 16. As best seen in FIG. 1, the bundle gripping apparatus 10 can be attached to an arm 18 of a manipulator 20 which is operable either under software control or via manual control, as will be more fully described herein. The arm 18 is sectioned and jointed for pivoting as at pivots 19 to allow the bundle gripping head 10 to be maneuvered up and down and for traversing between the locations 15 and 16, for example. The apparatus 10 is described as transferring bundles 12 to a pallet 16, but may be used to carry signatures between other locations such as within a signature handling apparatus, e.g. a signature stacker.

The present bundle gripping apparatus 10 is very flexible in that it is adapted to handle a wide variety of product or signature formats and is agile enough to be able to form most any pallet pattern desired. To this end, the bundle gripping apparatus 10 includes a plurality of bundle gripping units 22 that each include a pair of bundle gripping members, generally designated 24, and which cooperate to securely support and grip a bundle 12 during transport to the pallet 16. The gripping units 22 can be adjusted relative to each other along an elongate member 26 via adjustment mounts 28 of the units 22. Where a pair of gripping units 22 are utilized to support a single bundle 12, the adjustability of the gripping units along the elongate member 26 enables the gripping members 24, and particularly the lower gripping or support members to be properly laterally spaced from each other to accommodate various lengths of the bundles 12.

As can be seen in FIG. 1, the bundles 12 will typically be oriented so that their lengthwise dimension will be oriented parallel to the elongate member 26 or perpendicular to the length of the lower support members 24. Accordingly, the spacing between the lower support members 24 will dictate the location thereof along the length of the bundle 12. Optimum spacing of the gripping units 12 will be such that the lower support members 24 are close enough to the widthwise ends 30 of the bundles 12 so that the end portions of the bundles 12 extending laterally beyond the lower support members 24 will not excessively sag or droop while still adequately providing support to the intermediate portion of the bundles 12 between the lower support members 24. The adjustability of the gripping units 22 along the length 31 of the bundles 12 enables the apparatus 10 herein to readily handle different configurations of bundles 12, particularly with respect to the variation in bundle configurations in the lengthwise dimension thereof.

Similarly, the gripping units 22 are well adapted to handle a wide variety of bundle configurations where the variation occurs in the widthwise dimension that is oriented normal to the elongate member 26 and parallel to the length of the lower support members 24. More particularly, the gripping members 24 include an upper clamp member 32 and a lower support or fork member 34, each of which are capable of adjustment in a fore and aft direction relative to the gripping unit 22 thereof. In the preferred and illustrated form, the units 22 are very compact and each include a very narrow housing 36 whose widthwise dimension along the length of the adjustment member 26 is kept to a minimum, e.g. less than approximately three inches across the front and rear, between the sides thereof, for purposes to be described hereinafter. The upper clamp member 32 and lower fork member 34 are adjustable in terms of the extended positions to which they project relative to the housing 36, and more particularly the narrow front wall 38 (FIG. 9A) thereof.

To enable such adjustments of the extended positions of the upper clamp member 32 and lower fork member 34, adjustment controls, generally designated 40 and 42, respectively, for each are provided. As shown in the illustrated form in FIG. 10, the adjustment control 40 for the upper clamp member 32 is external of the housing 36 adjacent the front wall 38 thereof while the adjustment control 42 for the fork member 34 is external of the housing 36 adjacent narrow rear wall 44 thereof. Accordingly, with small size signature bundles 12, an operator can use the adjustment controls 40 and 42 to adjust the distances the clamp and fork members 32 and 34 project from their housing fronts 38 so that they are relatively close thereto. In this way, the lower fork members 38 will not project beyond the bottom of the bundle 12, and the clamp heads 32 can be oriented so as to engage the top of the bundle 12 at a position approximately mid-way along the widthwise dimension thereof.

On the other hand, with larger size signature bundles 12, the operator can utilize the adjustment controls 40 and 42 to adjust the distances that the clamp members 32 and lower fork members 34 project from their housing fronts 38 so that they are further therefrom. In this way, the fork members 34 will be able to support as much of the bundle 12 from underneath thereof as needed to avoid having the bundle 12 droop over the distal ends of the fork members 34 with the attendant disadvantages this creates, as previously described. Further, the clamp heads 32 can be situated to clamp centrally on the top of the bundle 12 as it did with the smaller size signature bundles 12. Accordingly, the adjustability of the upper clamp member 32 and lower fork member 34 to and from the housing 36 provides significant advantages in allowing the present apparatus 10 to handle bundles 12 that vary in their widthwise dimension to provide secure control thereover.

One of the significant advantages of the present apparatus 10 lies in its ability to handle multiple bundles 12 simultaneously. Depending on the size of the bundles 12, the number of gripping units 22 dedicated for handling the bundle 12 can vary. Accordingly, bundles 12 having a very small format can be handled by a single unit 22, while for those bundles 12 having larger formats, two or more units 22 can be utilized to support and carry the larger sized bundles 12.

More particularly, the elongate member 26 is preferably in the form of a long mounting rail 46 so that several narrow bundle gripping units 22 can be adjustably mounted thereto. In the preferred and illustrated form, four such units 22 are shown each including adjustment mounts 28 in the form of opposing hanger members 48 and 50 mounted to the top 52 of the housing 36. The hanger members 48 and 50 cooperate with the mounting bar 46 to allow the units 22 to slide along the length of the bar 46 to their desired position and then to be locked in place thereat. For this purpose, the hanger members 48 and 50 include a releasable lock or clamp such as in the form of screw clamp 52 that is operable to releasably fix the hanger members 48 and 50 at the desired position along the mounting rail 46.

Figure 3:
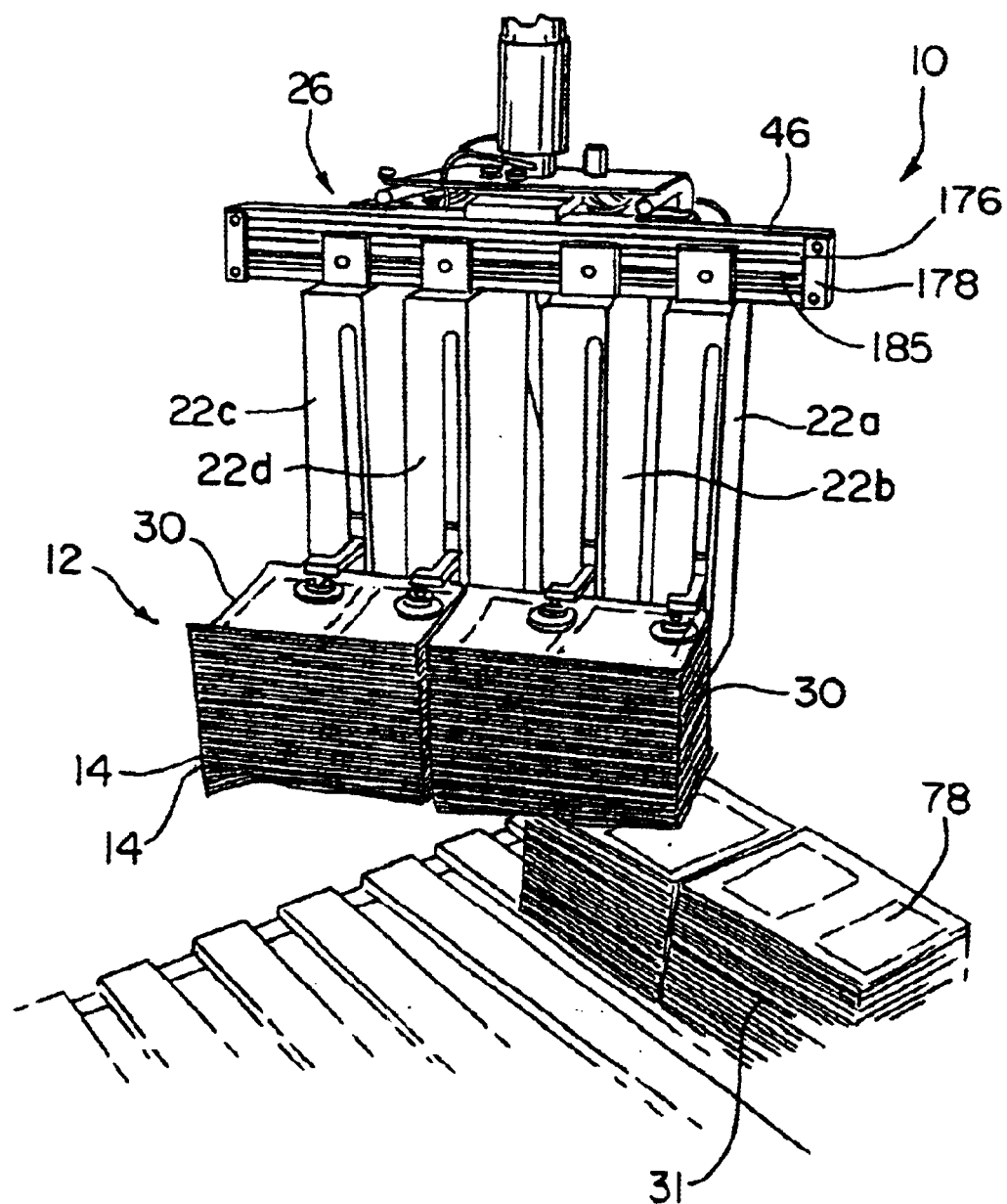
FIG. 3 is a view of the bundle gripping apparatus showing two pairs of gripping units with each pair cooperating to carry a bundle.
Figure 4:
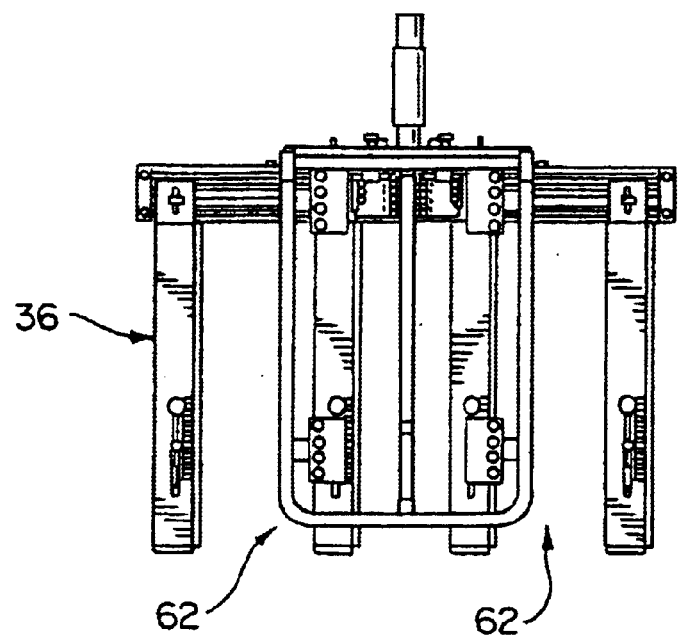
FIG. 4 is a rear elevational view of the bundle gripping apparatus showing the elongate rail member with the units hung therefrom.

In one typical situation, the apparatus 10 herein having four gripping units 22 will be able to simultaneously carry two bundles 12 in side-by-side relation to each other, as shown in FIG. 3. As can be seen, the units 22 have been shifted in pairs so that one pair of the units 22a and 22b are spaced to carry one of the bundles 12 while the other pair of the units 22c and 22d are spaced to carry the other bundle 12 with operation of the gripping members 24 of each of the unit pairs tied together. As can be seen, the spacing between the units 22a and 22b, and the spacing between the units 22c and 22d is approximately the same, whereas the spacing between the units 22b and 22d is slightly greater than that within the pairs of units associated with a bundle 12. As is apparent, the present apparatus 10 including the multiple gripping units 12 that are adjustable relative to each other provides significant flexibility in handling bundles 12 with differing signature lengths, as well as handling multiple bundles 12 simultaneously.

The present apparatus 10 also is adapted for both automated operation and manual operation via the manipulator 20 to which it is attached by robot arm 18. As can be seen best in FIGS. 2 and 5, the apparatus 10 includes a handle assembly 54 at the rear thereof and which can have operator controls 56 attached thereto. The housings 36 contain respective power operated drive systems, generally designated 58 and 60, which can be either automatically controlled by programmed software such as in circuitry in control box 61 on the automated manipulator 20 or can be actuated by the operator controls 56, as described hereinafter.

Using the handles 54, the operator can guide the movement of the apparatus 10 to the pick-up location 15 and align the units 22 with the bundles 12 thereat so that when the fork drive system 60 is actuated via the operator controls 56, the forks 34 will fit under the bundles 12 at the desired position along the length thereof. Because the housings 36 are very narrow, the bundles 12 will extend laterally beyond the units 22 to allow the operator to easily see around the housings 36 to the bundles and via the space 62 provided between the housings 36 that will be maximized in size providing the operator with a line of sight from the rear of the apparatus to the bundles 12 to be picked-up forwardly of the apparatus 10.

Once the bundles 12 are properly gripped by the apparatus 10 with the clamp and fork members 32 and 34 thereof, the operator can move the apparatus 10 carrying the bundles 12 therewith to their deposit location. Again, to properly orient the bundles 12 for drop-off at the pallet 16, the operator can get a good view of the deposit location around the units 22 and via the spacing 62 provided between the units 22. With the bundles 12 properly oriented, the operator then actuates the drive systems 58 and 60 to release the bundles 12 for deposit, as will be described more fully hereinafter.

The narrowness of the housing 36 and in particular the construction of the units 22 so that they carry bundles 12 to project laterally from either side of the housings 36 allows the bundles 12 to be tightly palletized one against the other without encountering interference from the housings 36. In other words, the size of the housing 36 so that it is narrower than the bundles 12 allows the bundles 12 to be highly maneuverable even in close quarters to other bundles 12 already on the pallet 16 so that they can be tightly fit thereagainst. For example, where space only exists for a single bundle 12 between other bundles 12, the operator can maneuver the apparatus 10 so that the bundle 12 fits into the space without having the narrow housings 36 engage the other adjacent bundles 12.

Figure 6:
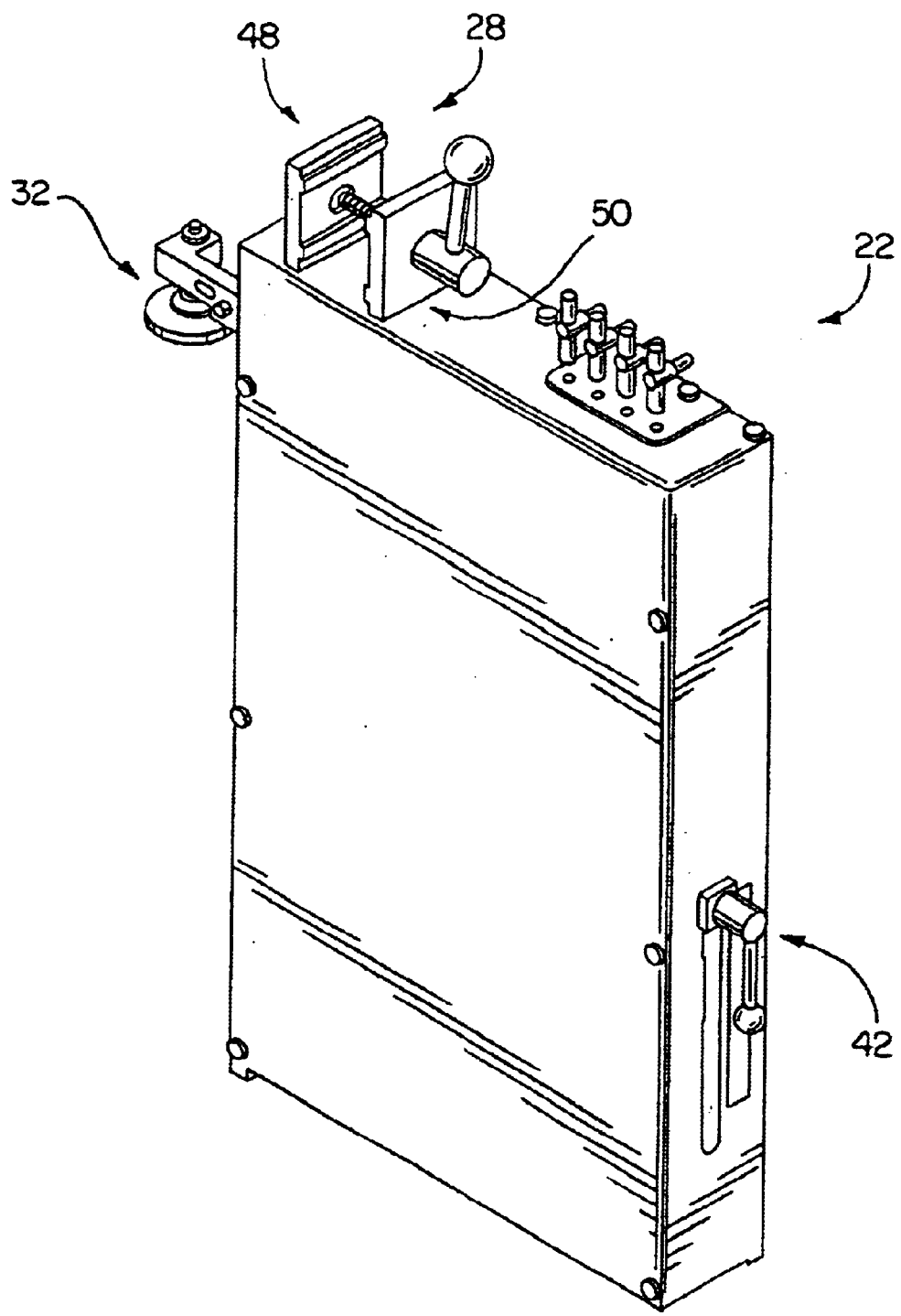
FIG. 6 is a perspective view of one of the bundle gripping units showing opposing hanger members at the top of the unit and adjustment controls at the rear and front of the unit for the gripping members of the unit.
Figure 7:
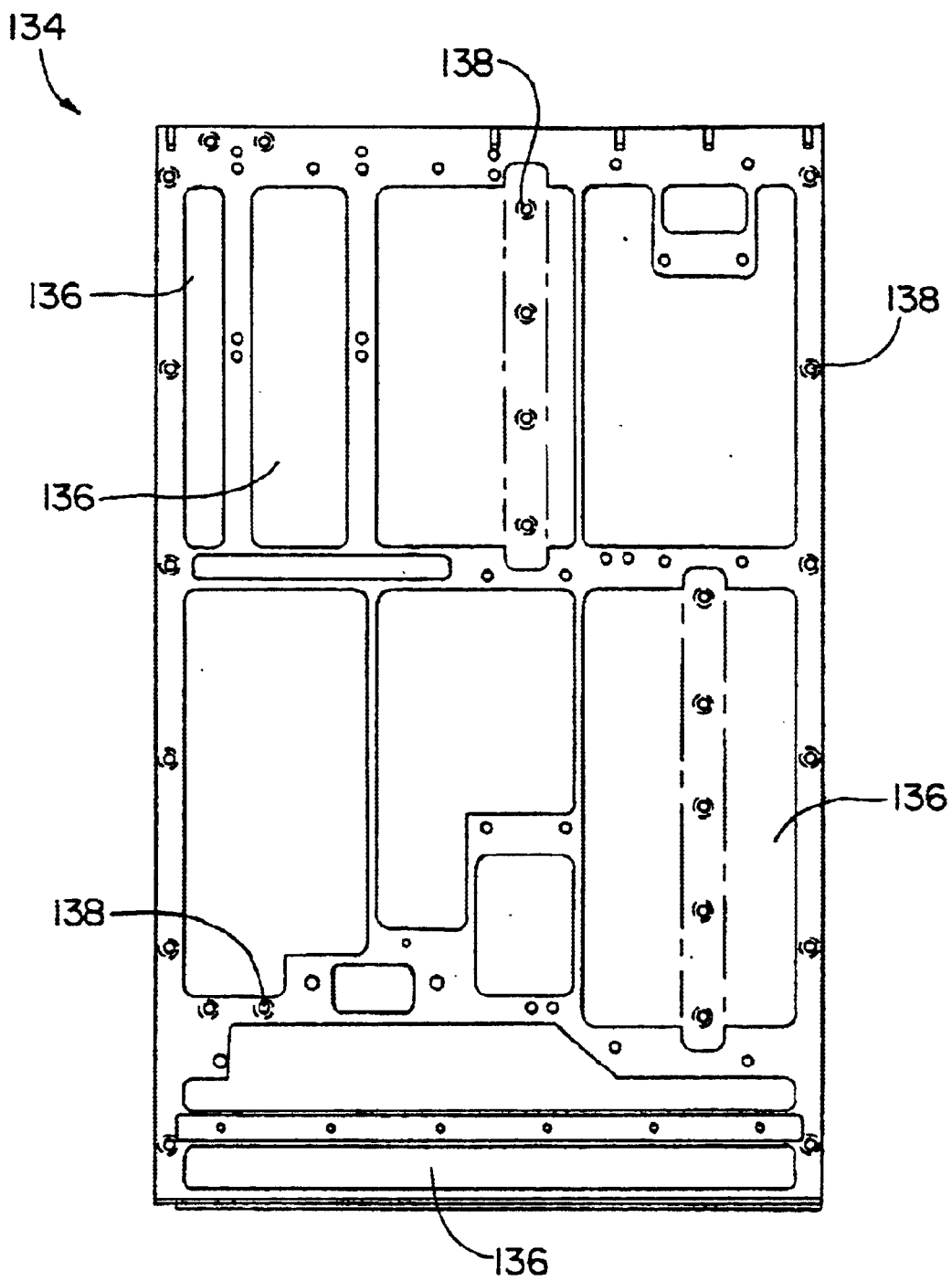
FIG. 7 is an elevational view of a side wall of the housing to which operating components of the unit are mounted.

The housings 36 are also sized in their vertical height dimension so as to allow them to maximize the height of the bundles 12 that they can handle. Generally, bundles 12 can range anywhere between four to seventeen inches in height. Accordingly, the height of the housing 36 is sized so that heights of bundles 12 in this range can be handled by the apparatus 10. By way of example and not limitation, the housing 36 can have a height of approximately 24 inches the clamp member 32 being mounted for sliding movement such that with a bundle 12 supported on the lower fork member 34 toward the bottom of the housing 36, the stroke of the clamp member 32 will be sufficient to accommodate the above-specified range of bundle heights for applying a secure clamping force on the bundles 12. In this regard, the housing front wall 38 is provided with a vertical slot opening 64 that extends from adjacent the top of the housing 36 down to a level spaced from the bottom of the housing 36 so that with the clamp member 32 in its uppermost position relative to the slot opening 64, it will be at a level adjacent with and slightly below the top of the housing 36 and spaced from the tallest bundle 12 it is to handle, while with the clamp member 32 advanced to its lowest position relative to the slot opening 64, it will be in position for clamping the smallest bundle height. Thus, as can be seen in FIG. 6, the housing 36 has a tall and very narrow construction so that it can handle various height bundles 12 while also affording an operator sufficient room to see around and between adjacent units 22 during manual manipulation of the apparatus 10.

The depth of the housing 36 is sized to allow the fork drive system 60 to fully retract the lower fork member 34 into the housing 36 through lower horizontal slot opening 66 in the housing front wall 38 while allowing substantially the full operative length of the fork member 34 to extend external of the housing 36 forwardly of the front wall 38 to maximize the size of bundles in their widthwise direction that can be handled by the apparatus 10 herein. At the same time, the housing depth is kept to a minimum, e.g. less than approximately 15 inches, so that an operator is not too remote from the bundles 12 they are manipulating. In other words, the housing 36 is no deeper than is necessary for retraction of the fork member 34 while affording good flexibility in the range of signature bundle formats that can be handled thereby. Thus, the units 22 have the stroke of their clamp member 32 maximized to enable the smallest bundle heights to be clamped therewith and have the stroke of their fork member 34 maximized to enable the largest widths of bundles 12 to be handled.

To provide these maximum stroke lengths for the clamp member 32 and fork member 34 while keeping the housings 36 relatively thin, the respective drive systems 58 and 60 utilize a drive ratio. In this manner, the strokes of the power actuators 68 and 70 for the drive systems 58 and 60 do not need to be as large as the clamp member 32 and fork member 34 that they drive. Thus, both the height and the depth of the housing 36 need only be slightly larger than the maximum height and maximum width of the bundles 12 to be handled by the apparatus 10. As is apparent, the width of the housing 36, e.g. approximately 3 inches, is significantly smaller than the housing height, e.g. approximately 24 inches, and depth, e.g. approximately 15 inches, so that the housing 36 is kept very narrow in the widthwise direction.

Figure 13A:
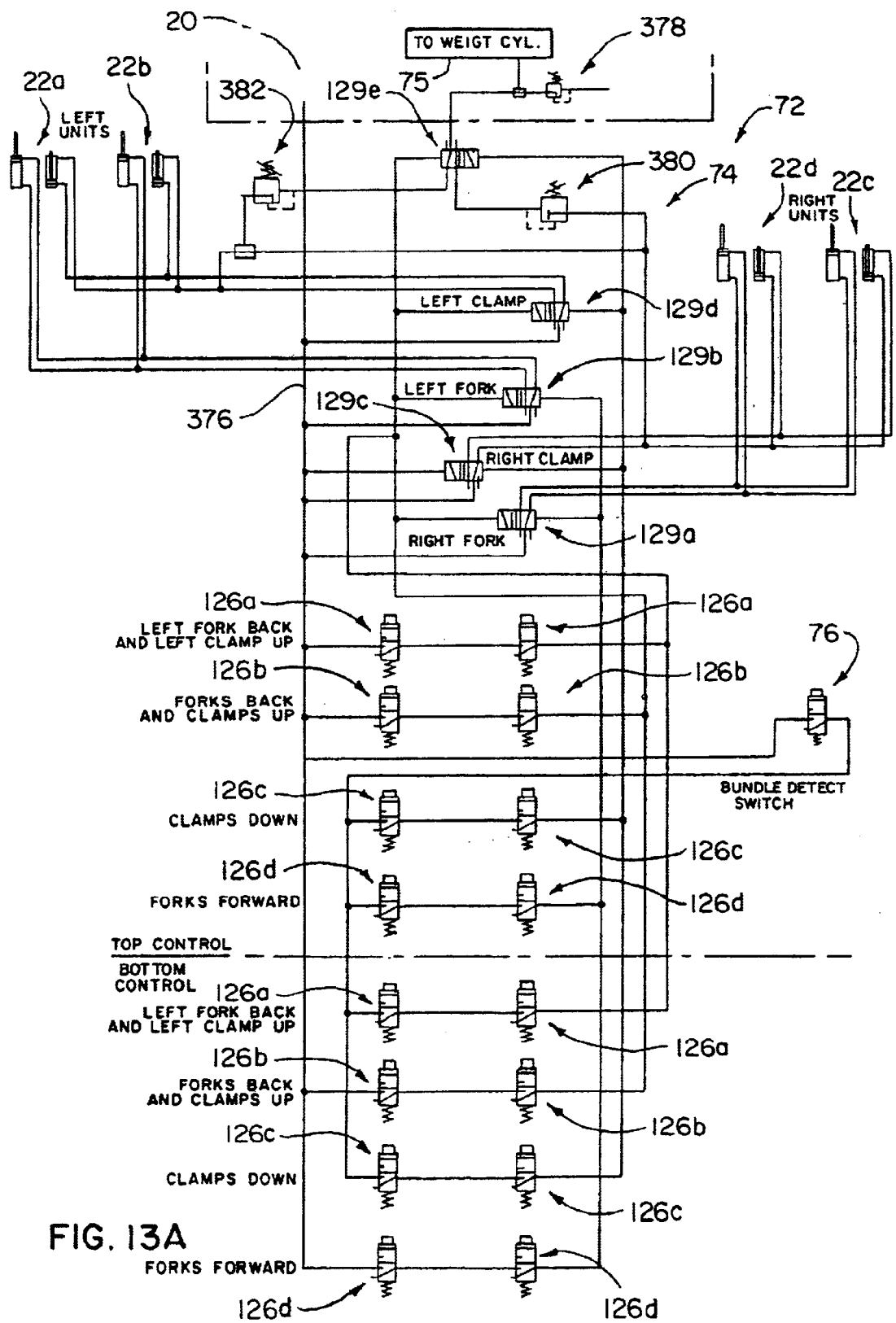
FIGS. 13A and 13B are diagrams of valving circuits actuated by the operator controls for providing a variable lifting force to the apparatus.

For further enhancing ease of the use and maneuverability of the apparatus 10, a load-balancing system 72 is preferably employed, as shown in the diagram of FIG. 13A. The load-balancing system 72 enables an operator to calibrate the lift provided by the manipulator arm 18 to the apparatus 10 depending on the load to be carried thereby. For this purpose, a valving circuit generally designated 74 is utilized in the load-balancing system 72 to control the flow of pressurized fluid to a lift cylinder 75 that provides the lifting force for the arm 18.

As shown, the valving circuit 74 is configured for the preferred and illustrated apparatus 10 having four bundle gripping units 22 for simultaneously picking-up and carrying a pair of bundles 12 therewith. The drive systems 58 and 60 and load balancing system 72 in their preferred forms are adapted to utilize pressurized air as is usually conveniently available to post press equipment rooms from a shop air source. Accordingly, the power actuators of the drive systems 58 and 60 are preferably pneumatic cylinders 68 and 70 and the valving circuit 74 for the load balancing system 72 likewise employs pneumatics to provide the lifting force at the apparatus 10.

A bundle sensor 76 detects when the pair of bundles 12 has engaged the housing front walls 38 to supply the maximum pneumatic lifting pressure with the forks 34 of all of the units 22 advanced for supporting the bundles 12 thereon. When one of the sets of the units 22a, 22b or 22c, 22d retract their forks 34 for depositing the bundle 12 they support, the pneumatic pressure will shift to the one bundle pressure level to keep the apparatus 10 pneumatically balanced. Similarly, when the forks 34 of the other unit set 22a, 22b or 22c, 22d are retracted to deposit the last bundle, the pressure level switches back to the no-load pressure level which is the minimum pressure provided by the load balancing system 72. In this manner, the operator can easily raise and lower the apparatus 10 for bundle pick-up and deposit operations to provide maximum maneuverability of the apparatus 10 with a minimum of physical effort.

Likewise, because of the essential weightlessness provided to the apparatus 10 by the balancing system 72, it will be much easier for an operator to manually cause the apparatus 10 to traverse the area between the pick-up and deposit locations 15 and 16 even with the apparatus 10 loaded with bundle(s) 12. When an operator pushes or pulls on the apparatus 10 to exert more of a lateral rather than a vertical or up and down force thereon, the apparatus 10 will in effect sense this operator-exerted force and be much more responsive thereto due to its weightlessness causing it to move accordingly. The movements of the weightless apparatus 10 will be proportional to the level of the operated-exerted force without requiring nearly the amount of effort from the operator that would be necessary absent the utilization of system 72 with the lifting force providing the apparatus 10 with a gliding-type action above ground level. And when the operator-exerted moving force is removed from the apparatus 10, i.e., when the operator stops pushing or pulling it, the forces are rebalanced so that the now stationary apparatus 10 remains suspended in its weightless state.

Thus, the balancing system 72 allows an operator to quickly manipulate the apparatus 10 between the pick-up location 15 and deposit location 16 with the precision movements thereof generated in a highly responsive fashion to operator control exerted thereover. To cover large distances, the operator can easily accelerate the speed of travel of the apparatus by pushing or pulling it slightly harder in the direction it is traveling with the apparatus 10 sensing the increased level of operator-exerted force and responding accordingly. For manipulating the apparatus 10 over smaller distances such as in tight or confined spaces, the operator can easily decelerate the apparatus to slow and/or stop it by exerting a braking force thereon generally opposite to the acceleration force that had been applied.

In addition, because each set of the gripping members 24 for carrying a bundle 12 associated with the sets of bundle gripping units 22a, 22b, and 22c, 22d are independently operable with respect to the other allowing the bundles 12 carried thereby to be carried simultaneously yet deposited separately from each other, the apparatus 10 allows for a wide variety of bundle patterns to be employed on pallet 16. Thus, the present apparatus 10 is very agile as an operator can maneuver it extremely easily while carrying the very heavy loads created by the multiple bundles 12 it supports, and further allows the operator to manipulate the bundles 12 so that they can be deposited either simultaneously or independently from each other, one at a time such as at different locations about the pallet or on different pallets 16.

Another advantageous feature of the present bundle gripping units 20 is in the ability of the upper clamp member 32 to self-adjust to the orientation of the bundles 12 on which it is clamped. As previously has been discussed, bundles 12 of signatures 14 can tend to build-up in an uneven fashion due to the presence of aligned spines or other thicker portions of the signatures 14 in the bundle 12. In this case, the upper portions of the bundles 12 will have a sloping configuration presenting a sloped upper surface 78 of the bundle 12 to the upper clamp member 32. This sloping can be relatively sever such as on the order of 30–60° from the horizontal.

To better accommodate for such sloping surfaces 78 and minimize the tendency of the bundle signatures 14 to shift laterally when a downward clamping force is applied thereto as with prior rigid clamping bars as previously described, the present clamping head 32 is provided with a universal pivot mount 80. The pivot mount 80 allows an engagement pad 82 of the clamping head 32 to pivot as it is brought down into engagement with the sloping bundle upper surface 78 so as to stay in flush engagement therewith during the clamping action provided by the clamp member 32.

The engagement pad 82 is shown in FIGS. 16A and 16B in the form of a small disk-shaped member 84 preferably of a low friction material such as plastic. The universal pivot mount 80 is in the form of a generally bell-shaped ball joint body 86 having a spherical ball joint (not shown) therein with the body 86 being secured to the disk-shape member 84 for universal pivoting thereof about pivot mount axis 80a. Accordingly, when the disk-shaped member 84 is brought into engagement with the sloped upper surface 78 it will pivot to accommodate the sloped angle thereof via the universal pivoting provided by the ball joint body 86 to which it is attached. Thus, when the clamp member 32 is fully clamped onto the bundle 12, the engagement pad 82 will stay in substantial flush engagement with the sloping bundle upper surface 78 to grip the bundle 12 between it and the lower fork member 34 at the bundle upper surface or uppermost signature 78 and bundle lower surface or lowermost signature 88, respectively.

The pivoted engagement pad 82 constrains the signatures 14 in the bundle 12 from lateral shifting despite the uneven buildup of signatures 14 therein. Instead of pushing straight down on the sloped bundle 12 with the downward clamping force applied to the clamp head 32, the clamp head 32 pivots and thus redirects some of the downward force back in a direction that resists lateral and downward shifting of the signatures out of alignment from the bundle stack. The small size of the engagement pad 82, e.g. approximately 2.25 inches in diameter, along with the ability to position the clamp head 32 substantially centrally with respect to the width of the bundle 12 as previously described also provides a better distributed clamping force throughout the bundle 12 versus rigid clamping bars that may only engage the bundle at the highest portions thereof.

Figure 2:
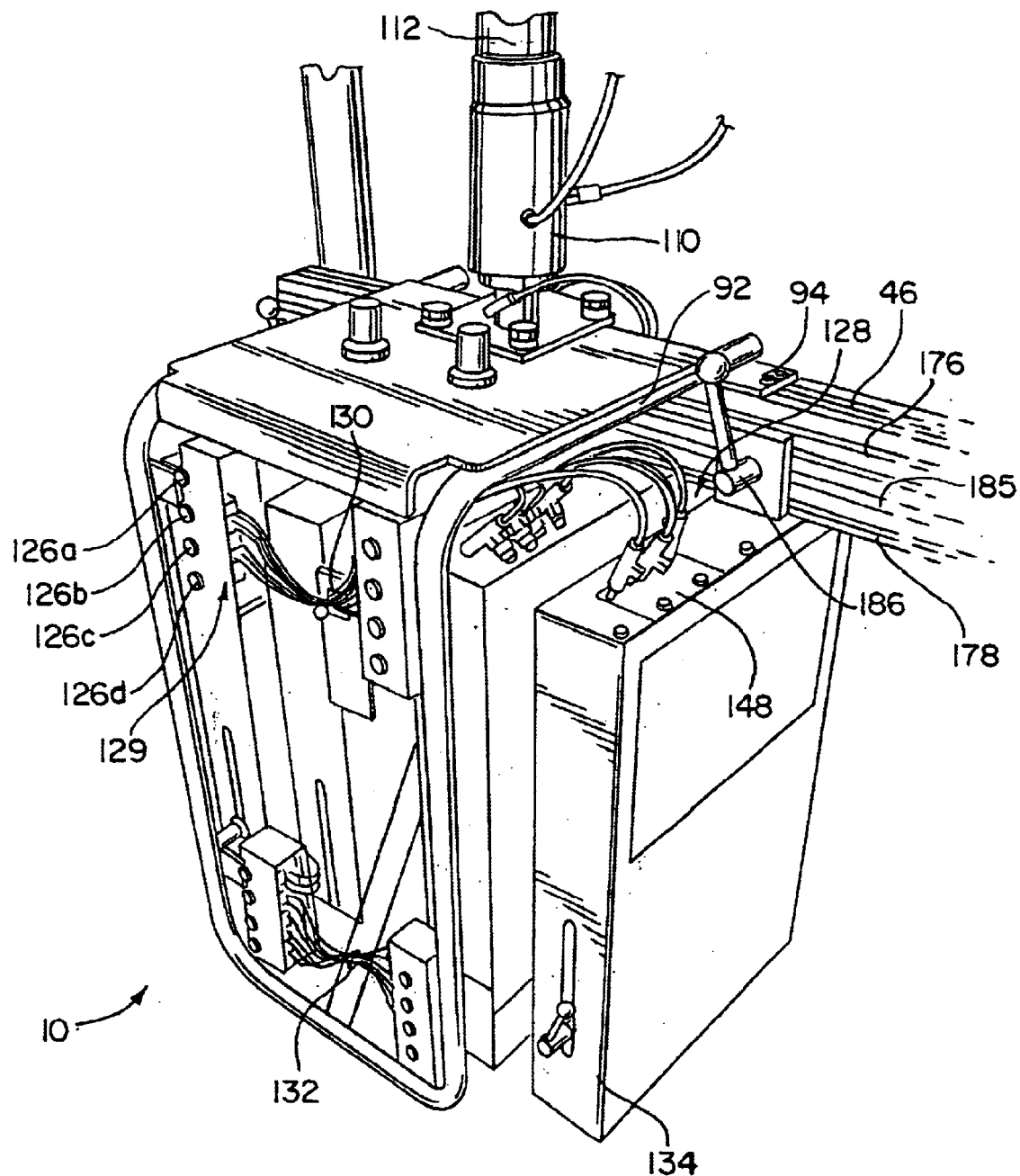
FIG. 2 is a rear view of the bundle gripping apparatus including the gripping units showing a handle assembly and operator controls for allowing an operator to manipulate the apparatus.
Figure 5:
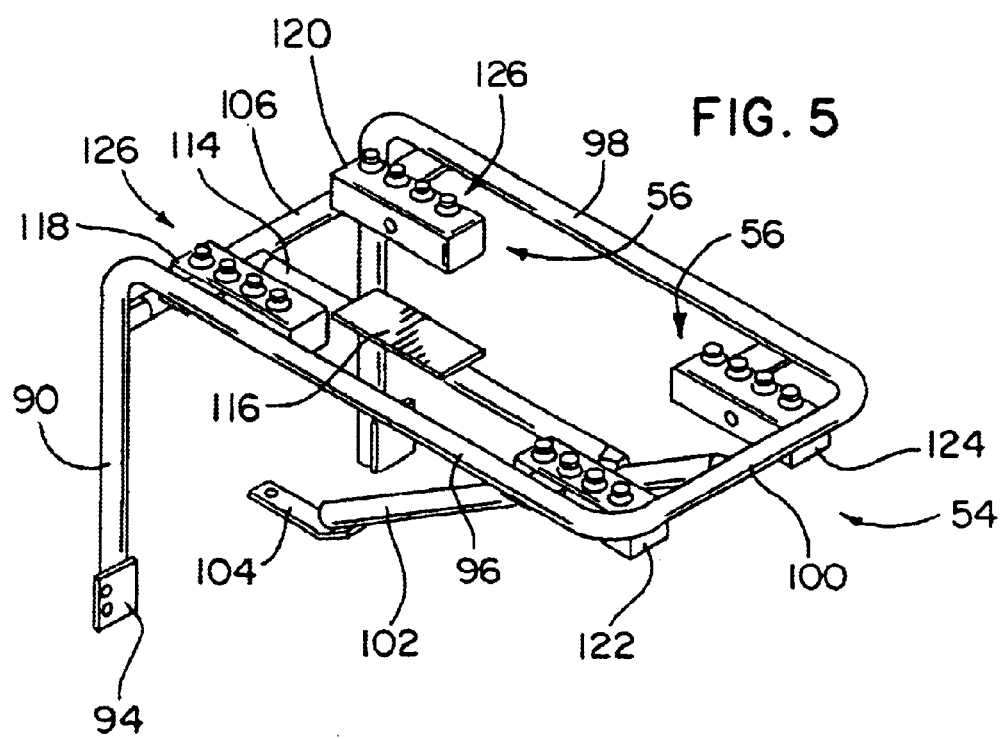
FIG. 5 is a perspective view of the handle assembly including the operator controls mounted thereto showing an upper set of controls and a lower set of controls with each set redundant to the other.

Turning next to more of the details of the bundle gripping apparatus 10, referring to FIGS. 2 and 5, it can be seen that the handle assembly 54 is formed of extruded tubing having a pair of upper tube portions 90 and 92 extending horizontally above the bundle gripping units 22 and having plate mounts 94 at their free ends that are bolted at the top of the mounting rail 46. At the rear of the upper tube portions 90 and 92 they curve downwardly to form a vertical extending tube portions 96 and 98 which are interconnected toward their bottom by bottom tube portion 100.

The vertical tube portions 96 and 98 are laterally spaced to allow an operator to comfortably grip them with both hands. The tube portions 96 and 98 have a vertical extent slightly greater than the height of the housings 36 to allow an operator to adjust their grip over a wide vertical range of positions. For example, when dealing with higher bundle pick-up or deposit surfaces, the operator can grab the tube portions 96 and 98 closer to their bottoms. On the other hand, when dealing with lower bundle pick-up or deposit surfaces, the tube portion 96 and 98 can be gripped higher up along their length so the operator need not bend over for lowering the apparatus 10.

Intermediate the vertical tube portions 96 and 98, connecting tube portion 102 extends upwardly and forwardly and has a plate mount 104 at its free end for being secured to the rear of the elongate rail member 46. Slightly forwardly from the juncture of the upper tube portions 90 and 92 with their respective vertical tube portions 96 and 98 there is a upper support tube portion 106 that extends therebetween.

A large cover platform 108 is attached over the upper tube portions 90, 92 and 106. The cover platform 108 has a cylindrical coupling 110 projecting upwardly therefrom for receiving the lower end 112 of the manipulator arm 18 therein. Extending downwardly from the upper support tubular portion 106 is a vertical tube portion 114 connected at its lower end to the angled tube portion 102. A mounting plate 116 is attached to the tube portion 114 intermediate the ends thereof.

Referring to FIGS. 2 and 5, box housings 118 and 120 are attached adjacent the upper ends of the vertical tube portions 96 and 98 with the mounting plate 116 disposed generally therebetween. A lower set of box housings 122 and 124 for the operator controls 56 are mounted adjacent the lower ends of the vertical tube portions 96 and 98. The box housings 118–124 have user-operated push buttons, generally designated 126, that control flow of power fluid preferably pressured air through air lines 128 for operation of the pneumatic cylinders 168 and 170. Valves, generally designated 129, in the housings 118 and 124 are operated by the push buttons 126.

The upper set of box housings 118, 120 are redundant to the lower set of box housings 122, 124 in terms of the operations of the unit gripping members 24 that they control. Accordingly, an operator can be gripping the handle portions 96 and 98 toward their upper ends when dealing with lower bundle pick-up and/or deposit locations and use the controls 126 on the upper set of box housings 118 and 120 to the same effect as they can using the controls 126 on the lower set of box housings 122 and 124 when gripping the handle portions 96 and 98 toward their lower ends for dealing with higher bundle pick-up and deposit locations.

The pneumatic lines 128 are routed to and from the valves 129 in the control boxes 118–124 for control of air flow therethrough via the push buttons 126. To keep the air lines 128 organized, small ring members 130 and 132 are attached to the mounting plate 116 and the inclined tube portion 102 toward the lower end thereof. Accordingly, the air lines 128 that run through the valves 129 in the control boxes 118 and 120 on either side of the mounting plate 116 are run through the ring member 130, and the air lines 128 that run through the valves 129 in the control boxes 122 and 124 on either side of the tube portion 102 are run through the ring member 132.

The details of the construction of the housings 136 of the bundle gripping units 132 will next be described. The housing 36 includes a main support side wall 134 that has several milled pockets 136 and tapped apertures 138 for supporting bearing and guide assemblies for the clamp and fork members 32 and 34 and operating components of the drive systems 58 and 60, as will be described further herein.

Figure 8:
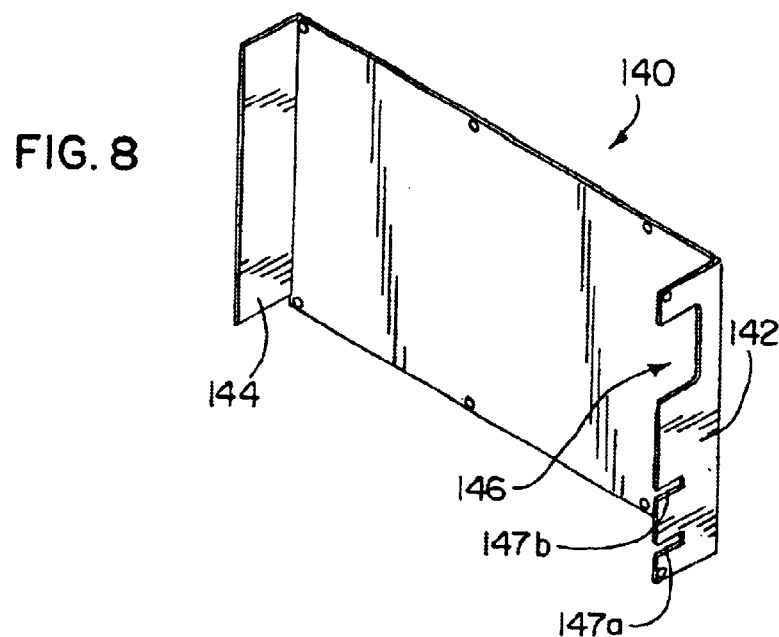
FIG. 8 is a perspective view of a cover of the housing including upper, lower and side panel portions thereof.
Figure 14A:
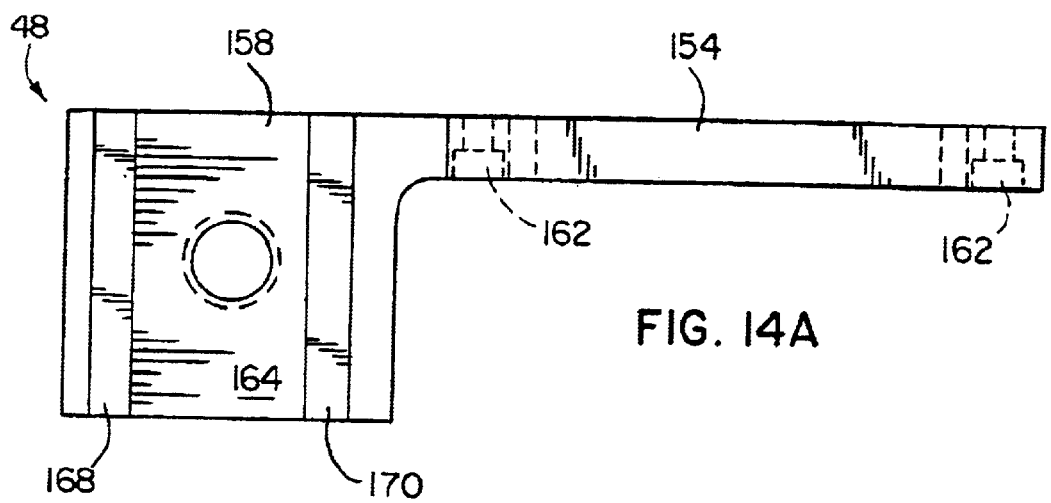
FIGS. 14A and 14B are elevational views of one of the hanger members of the gripping unit that is releasably secured to the rail member of the gripping apparatus.
Figure 14B:
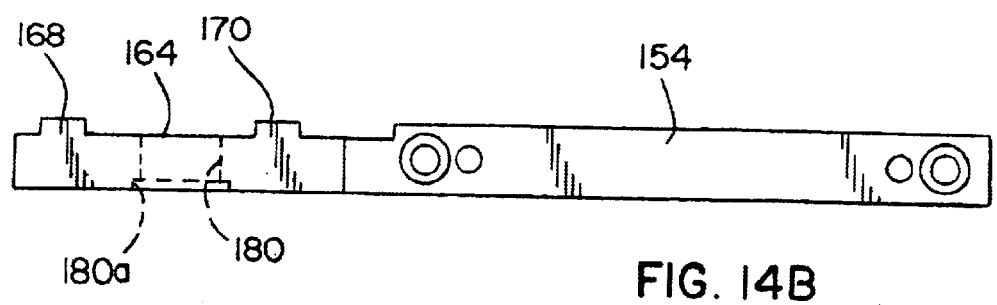
Figure 10:
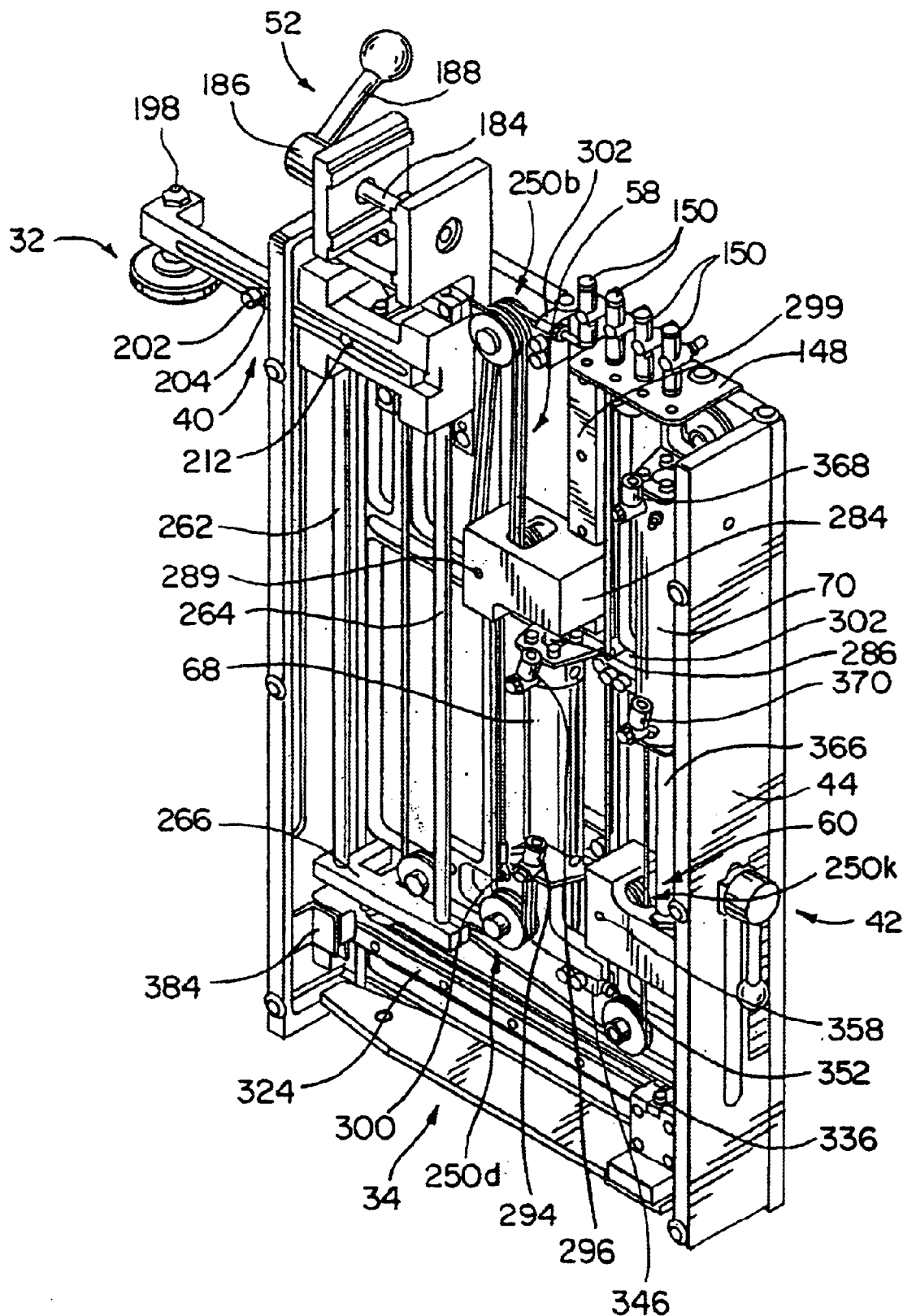
FIG. 10 is a perspective view of one of the units with the guard cover removed to show the internal operating components thereof including the drive systems for the gripping members, and the lower fork gripping member.

The opposite side of the housing 36 is formed by side panel 140. The side panel 140 also includes transversely extending upper and lower panel portions 142 and 144 that form the top and bottom of the housing 36. As can be seen in FIG. 8, the upper panel portion 142 includes a large opening 146 toward the rear thereof and in which a mounting plate 148 is attached. As shown in FIG. 10, the plate 148 can have four feedthrough connector ports 150 to which the air lines 128 are attached to allow the pressurized air to flow into the pneumatic cylinders 68 and 70 in the housing 36 via a pair of cylinder ports of each cylinder 68 and 70, described hereinafter. Toward the front of the pawl portion 142 are a pair of smaller slot openings 147a and 147b for the hanger members 48 and 50, as will be described hereinafter.

Figure 9A:
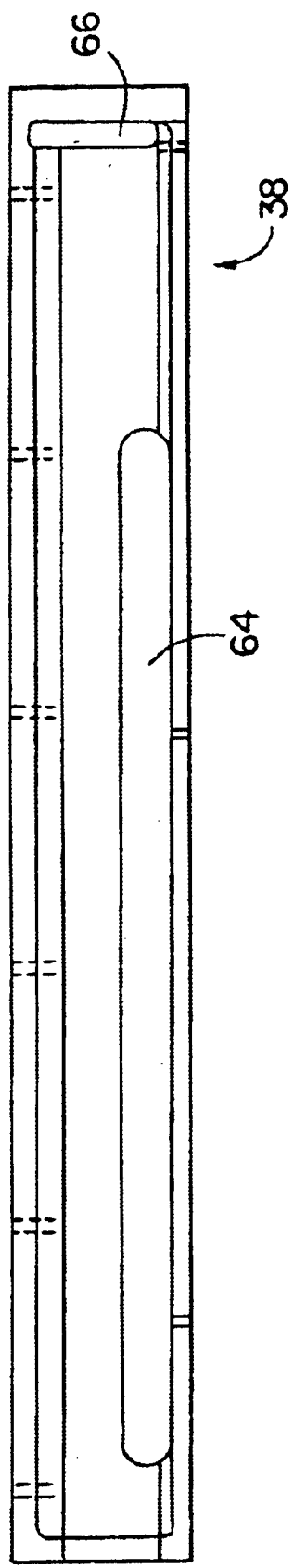
FIG. 9A is an elevational view of an elongate front wall showing transverse slot openings to allow for shifting of the gripping members of the unit.
Figure 9B:
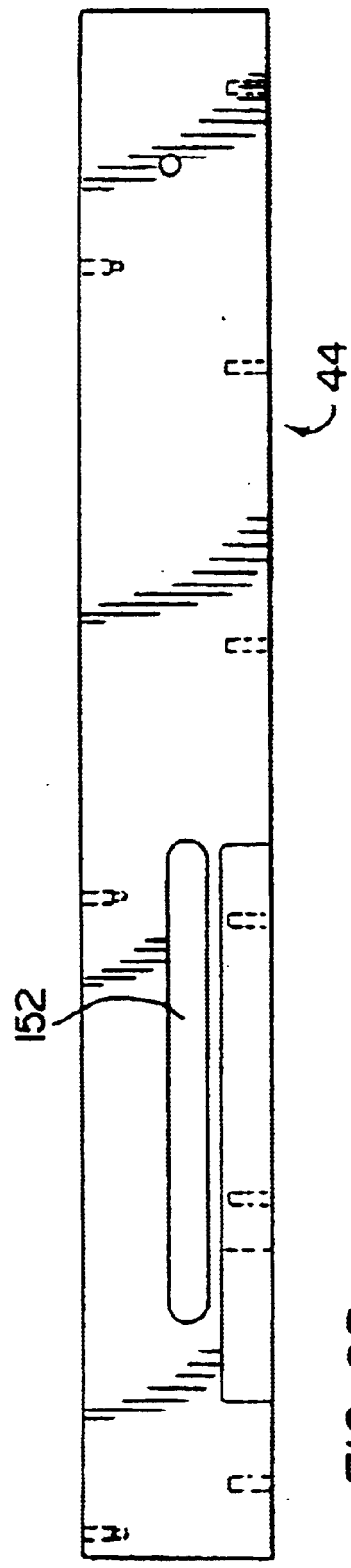
FIG. 9B is an elevational view of a rear wall of the housing showing a slot opening for the rear adjustment control.

Referring to FIGS. 9A and 9B, the front and rear walls 38 and 44 of the housing 36 are sized to extend the length of the side wall 134 and side panel 140 between the upper and lower panel portions 142 and 144 and to span the narrow distance between the side wall 134 and side panel 140. As previously described, the front wall 38 includes transversely oriented slots including long vertical slot 64 and shorter horizontal slot 66 spaced closely adjacent the bottom of the wall 38. By way of example and not limitation, the vertical slot 64 can extend for an operative length of approximately 420 mm to accommodate the long stroke of the clamp member 32 for handling a wide range of bundle heights, as previously described. Further, the lower slot 66 can be spaced from the bottom of the housing by approximately 15 mm. The lower slot 66 can have a length in the widthwise direction of the housing 36 of approximately 52 mm that is slightly greater than that of the lower fork member 34 to keep the width of the housing 36 to a minimum.

The rear wall 44 is also provided with a vertical slot 152 for the adjustment control 42 of the fork member 34. As shown, the slot 152 is disposed at the lower half of the vertical wall 44 and can extend for an operative length of approximately 175 mm. Both the front and rear walls 38 and 44 have a width of approximately 72 mm which generally corresponds to the narrow width of the housing 36 less the thickness of the side wall 134 and panel 140.

To support the housing 36 depending off of the mounting rail 46, the hanger members 48 and 50 include elongate bar portions 154 that depend from enlarged head portions 158 and 160, respectively, as best seen in FIGS. 14A, 14B, 15A, and 15B. The bar portions 154 and 156 are sized to fit down into the housing 36 through the slots 147a and 147b so that the heads 158 and 160 are external of the housing 36 at the top panel portion 142 thereof. The bar portions 154 and 156 include countersunk throughbores 162 for securing the hanger members 48 and 50 to the main support wall 134 of the housing 36 via aligned apertures 138 thereof. The head portions 158 and 160 have facing surfaces 164 and 166 with a pair of parallel raised ribs 168 and 170, and 172 and 174, respectively, formed thereon and extending in the widthwise direction of the housing 36 parallel to the mounting rail 46.

The mounting rail 46 is extruded with parallel upper and lower channels 176 and 178 formed on the front and back thereof and running longitudinally along the length of the rail 46, as can be seen in FIGS. 2 and 3. These channels are sized to slidingly receive the ribs 168–174 therein. Central apertures 180 and 182 are formed in the head portions 168 and 170 between the respective ribs 168–174 thereof. The screw clamp 52 includes a shank 184 having a threaded distal end that can extend through a central longitudinally extending through opening 185 in the rail 46. The aperture 180 has a clearance sizing with respect to the shank 184 whereas the aperture 182 is threaded with threads corresponding to that on the end of the shank 184. An enlarged proximate portion 186 of the shank 184 seats against the head portion 158 of the hanger member 48 in counterbore portion 180a of through aperture 180. The enlarged shank portion 186 has a handle 188 extending radially therefrom.

The hanger members 48 and 50, and particularly the head portion 158 and 160 thereof are spaced from each other to receive the mounting rail 46 therebetween with the ribs 168–174 received in the rail channels 176 and 178. With the handle 188 rotated in a loosening direction, the head portions 158 and 160 will be unclamped from the rail 46 to allow the head portions 158 and 160 including the ribs thereof 168–174 to slide lengthwise along the rail member 46 guided in the rail channels 176 and 178 to adjust the position of the units 22, as previously has been discussed. Once the units 22 have been adjusted to their desired position along the length of the rail 46, the handle 188 is rotated in a tightening direction whereby the threaded engagement of the screw-clamp shank 184 with the head portion 160 of the hanger member 50 will cause the hanger members 48 and 50 to be drawn toward each other. In this manner, the head portions 158 and 160 will be clamped to the rail 46 with the ribs 168–174 tightly pressed against the channel ago surfaces to prevent sliding therein for releasably locking the units 22 in place on the rail 46.

The adjustment control 40 for the clamp member 32 will next be described. The clamp head 32 includes an adjustable slide bar 190, as shown in FIGS. 18A and 18B. The slide bar 190 includes an elongate bar portion 192 and a small right-angle foot portion 194. The foot portion 194 is at the forward end of the slide bar 190 and includes a vertical through aperture 196 for receiving a fastener 198 therethrough. The fastener 198 threadably attaches the balljoint body 86 to the slide bar foot portion 194 via central threaded opening 86a of the body 86 (see FIGS. 17A and 17B) so that the clamping pad 82 is disposed below the slide bar portion 194.

Figure 11:
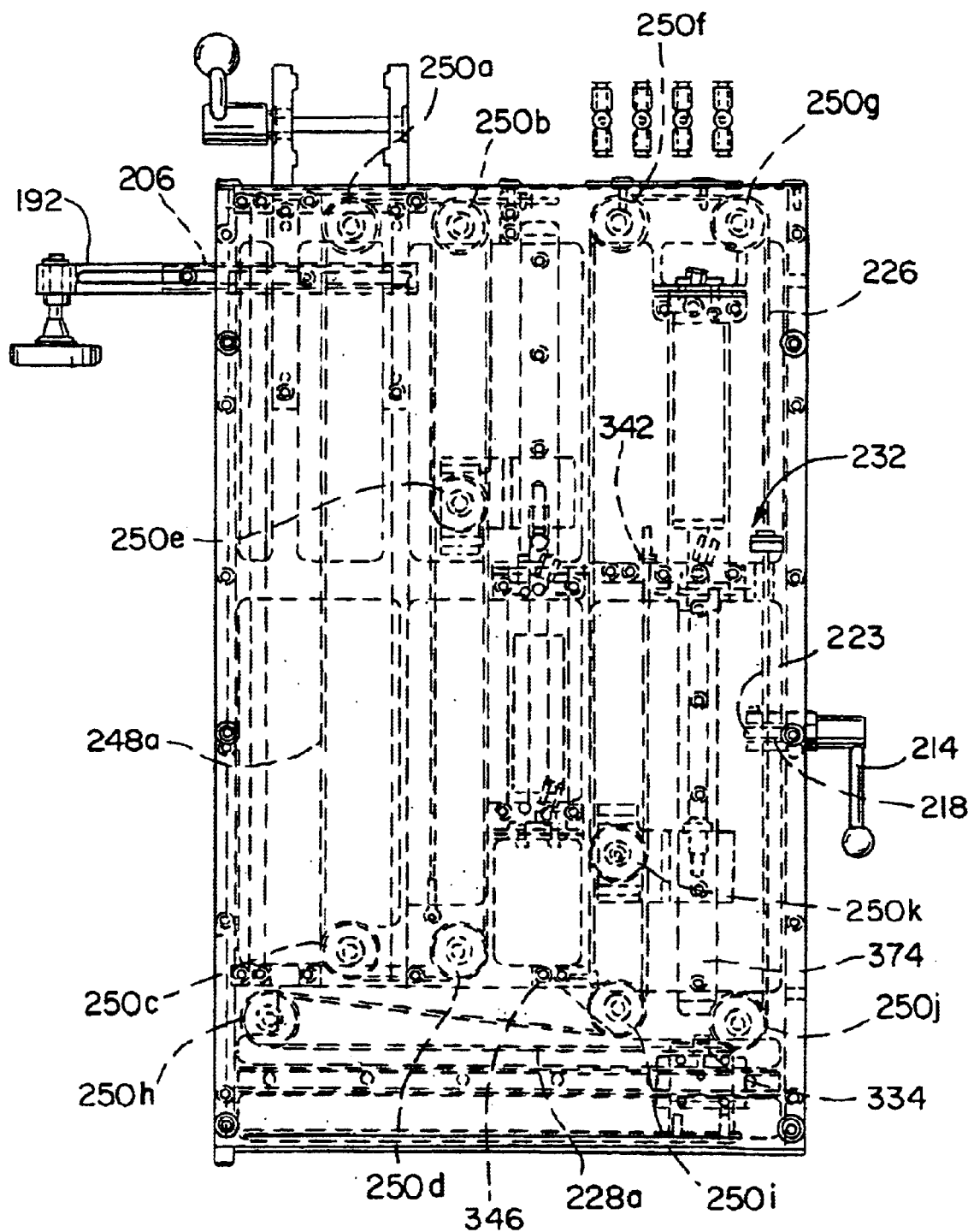
FIG. 11 is an elevational view of one the bundle gripping unit showing in phantom the routing of a drive cable for each of the drive systems.

The elongate bar portion 192 includes an elongate slot 200. The slot 200 extends through the bar portion 192 from one side thereof to the other. A releasable lock in the form of thumb screw 202 is provided which includes a shaft 204 that extends through the slot 200 external of the housing 36 closely adjacent the front wall 38 thereof. The shaft 204 is threaded to an internally threaded member 206 on the opposite side of the slot 200 of the bar portion 192, as can be seen in FIG. 11.

Figure 21A:
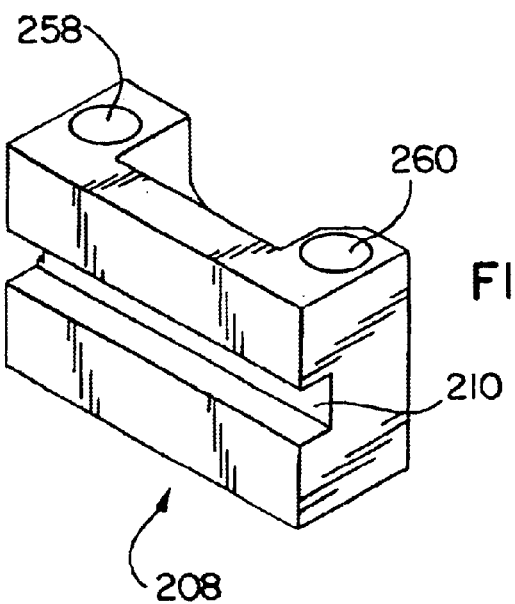
FIGS. 21A and 21B are views of a bearing block showing a slot for receipt of the slide bar of the clamp head and throughbores for guide bushings.
Figure 21B:
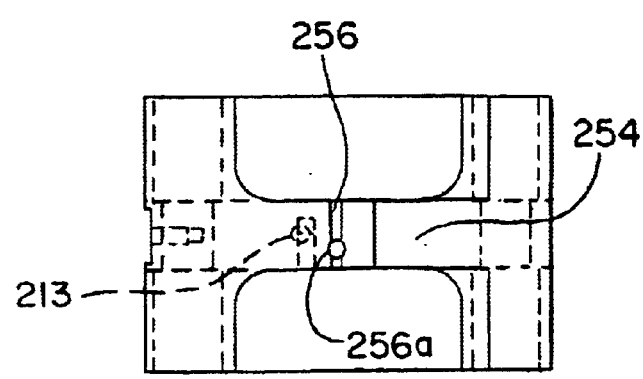

The slide bar 190 is oriented to project forwardly from the housing front wall 38 through the vertical slot 64 thereof generally parallel to the top and bottom of the housing 36 by way of bearing block 208 (see FIGS. 21A and 21B). The bearing block 208 has a recessed channel 210 in which the rear portion of the elongate bar portion 192 of the slide bar 190 is slidingly received. A stop fastener 212 is screwed into a threaded hole 213 in the bearing block channel 210 for limiting the forward limit of movement of the slide bar 190.

Accordingly, to adjust the extended position of the clamp member 32, a user turns the thumb screw 202 in a loosening direction which allows the slide bar 190 to be adjusted to a position either further from the housing 36 or closer thereto. In the preferred and illustrated form, the slot 200 has an operative length of 194 mm to allow it to accommodate a typical range of widths of signature bundles 12 that the bundle gripping apparatus 10 may need to handle for maximum flexibility thereof, e.g. bundles 12 that are between four inches to thirteen inches long in their widthwise dimension. Once the user has the clamp head 32 oriented in its desired position which generally will be centrally along the width dimension of the bundle 12, the thumb screw 202 is tightened so as to fix the clamp head 32 in its adjusted, extended position.

Figure 12:
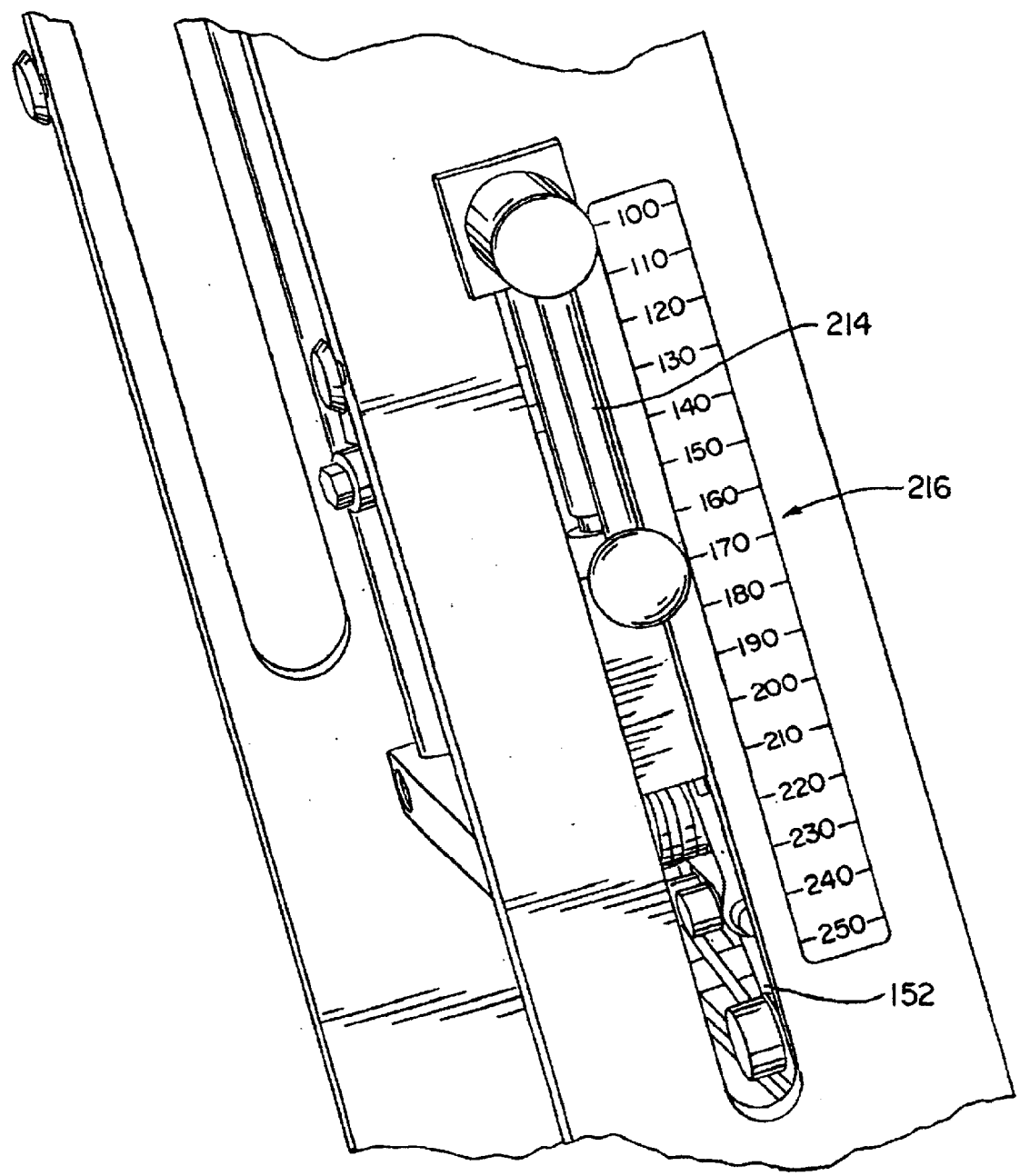
FIG. 12 is an enlarged perspective view of the rear of one of the gripping units showing the adjustment control for the fork member including a user operator control member and a scale along which the control member can be shifted.

The adjustment control 42 for the lower fork member 34 is at the rear of the housing 36, as previously mentioned. The adjustment control 42 includes a user operator control member in the form of handle 214 that is adjustable along the length of the vertical slot 152, as best seen in FIG. 12. As shown, a scale 216 is attached adjacent the slot 152 so that a user will know how far the fork member 34 will extend forwardly from the housing front wall 38 via the indicia thereon showing these distances. Accordingly, a user can turn the handle 214 to loosen it so as to adjust the position thereof in the slot 152 and along the scale 216 until it is aligned with the desired extended position. As illustrated, the fork member 34 has a range of extended positions with its distal end spaced forwardly from the housing front wall 38 between 100 mm and 250 mm. When the user reaches the desired extended position as shown on the scale 216, they turn the handle 214 so as to fix the handle 214 in place in the slot 152.

Figure 30:
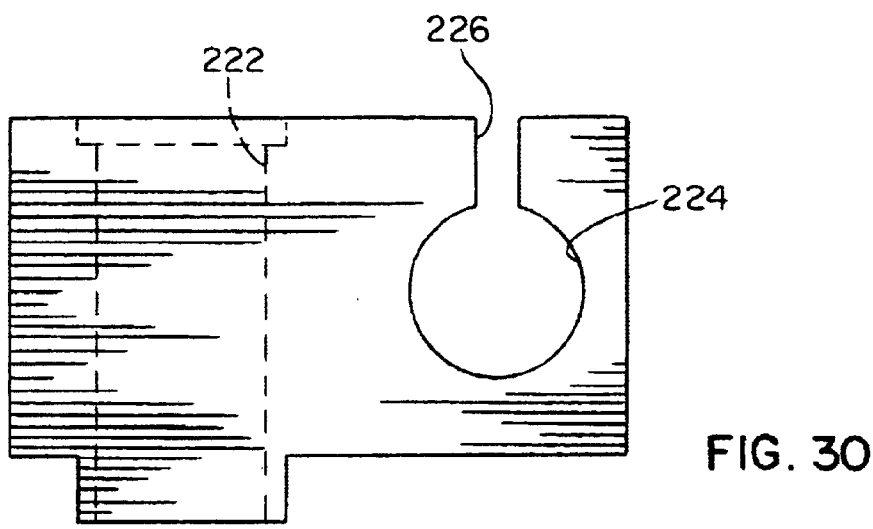
FIG. 30 is an elevational view of an abutment block for the adjustment control of the upper clamp member showing a split through opening through which the cable of the fork member drive system runs.
Figure 31A:
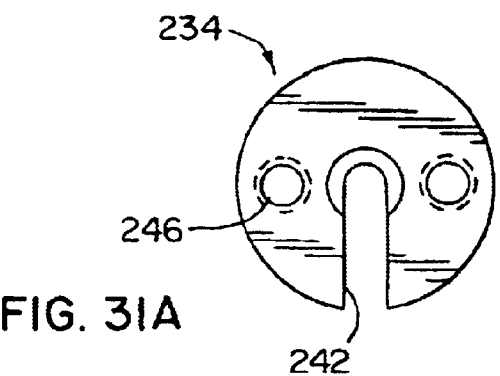
FIGS. 31A and 31B are elevational views of collar portions showing slots thereof that cooperate for mounting the collar portions to the cable of the fork member drive system.
Figure 31B:
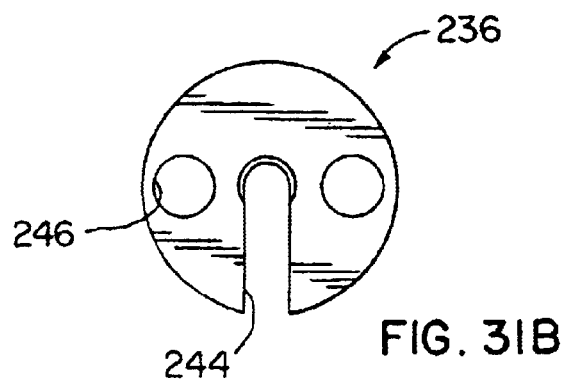

More specifically, the handle 214 external of the housing 36 is connected to a threaded shaft 218 that extends through the slot 152 into the housing and is threaded to an abutment block 220. The shaft 218 extends through throughbore 222 of the block 220 and is threaded to internally threaded nut 223 in the rear of the bore 222, as can be seen in FIGS. 11 and 30. When the handle 14 is tightened, the rear of the block 220 is drawn tight against the interior side of the housing rear wall 44. The block 220 also has a vertical through opening 224 through which cable 228 (FIG. 27) of the fork member drive system 60 is run. As will be described more fully herein, the cable 228 controls shifting of the fork member 34 between its advanced and retracted positions as the cable 228 is driven by the actuation of the pneumatic cylinder 70. To allow the cable 228 to be fit into the through opening 224, a lead-in slot 226 extends from the rear of the abutment block 220 and opens to the through opening 224.

The cable 228 includes a pair of enlarged, more rigid portions 230 intermediate the ends thereof. These enlarged portions 230 can have a ball and double-shank construction where shanks 230a extend about the cable 228 from either side of an enlarged ball 230b, as shown in FIG. 27. To form a stop 232 on the cable 228, a pair of collar members 234 and 236 are utilized. The collar members 234 and 236 each have a disk-shaped body 238 and 240, respectively. The disk bodies 238 and 240 each have an open-ended slot 242 and 244 extending radially out from the center and opening to the peripheral outer edge thereof. To attach the collar members 234 and 236 to the drive cable 228, one of the enlarged cable portions 230 is slid through the slots 242 and 244 from the open end thereof to the center of the disk bodies 238 and 240. The collar members 234 and 236 are oriented so that the slots 242 and 244 do not overlap except at the center thereof in which the ball 230b is disposed. The disk bodies 238 and 240 each include through apertures 246 on either side of the center of their respective slots 242 and 244 that can be aligned for receiving fasteners to secure the collar members 234 and 236 together and onto the cable 228 and forming the stop 232 thereon.

When the fork member 34 is advanced out from the housing 36, the routing of the cable 228 of the cable drive system 60 is such that it travels downwardly through the through opening 224 of the abutment block 220. As seen in FIG. 11, the stop 232 is on the cable 228 is disposed above the top of the vertical slot 152 in the housing 36 and thus above the abutment block 220 that travels along the slot 152 as the control 42 is adjusted. Thus, as the cable 228 travels downwardly, the stop 232 will be brought toward the abutment block 220 until it engages therewith preventing further advancement of the fork member 34 out forwardly from the housing 36. To this end, the collars 234 and 236 have a larger diameter than the block opening 224 so that they engage the block 220 thereabout.

As is apparent, the higher up the abutment block 220 is shifted relative to the slot 152, the closer it is to the stop 232 with the fork member 34 retracted in the housing 36 thus shortening the stroke of the fork member 34 out from the housing 36. Similarly, as the abutment block 220 is lowered along the slot 152 via the handle 214 connected thereto, the stop 232 will have a longer travel distance before it engages the abutment block 220, thus allowing the fork member 34 to extend further out from the housing 36. The scale 216 is calibrated to reflect the above-described arrangement and to show exactly how far out from the housing 36 the fork member 34 will extend depending on where the handle 214 is locked in place with respect to the length of the slot 152 and the indicia on the scale 216 adjacent thereto.

As mentioned, the drive systems for the clamp and fork members 32 and 34 are preferably cable drive systems 58 and 60 and include a cable 248 for the drive system 58 constructed similar to the previously described cable 228 including an enlarged portion 230 intermediate the ends thereof, as can be seen in FIG. 26. Each of the cables 228 and 248 are trained about a series of pulleys 250 with the cables running in peripheral grooves 252 thereof, as shown in FIGS. 25A and 25B. The cables 228 and 248 are anchored at their ends, as will be described further hereinafter. The pulleys 250 for the cable or pulley drive system 58 include upper pulleys 250a and 250b (250b designates a pair of pulleys, as shown in FIG. 10) and lower pulleys 250c and 250d (250d designates a pair of pulleys, as shown in FIG. 10) aligned therebelow in the forward region of the housing 36, as best seen in FIG. 11.

The cable 248 routed about the pulleys 250a–250d has its enlarged portion 230 fixed to the rear of the bearing block 208. Referring to FIG. 21B, the bearing block 208 has a centrally extending raised wall portion 254 at one side generally aligned with the centrally extending recessed channel 210 at the other side thereof. The wall portion 254 has a small vertically extending slot 256 formed intermediate the ends of the wall portion 254. The slot 256 has an enlarged section 256a configured to tightly receive the ball portion 230b of the cable 228 therein. Accordingly, as the drive cable 248 is driven by actuation of the pneumatic cylinder 68, the bearing block 208 fixed thereto will shift vertically causing the clamp member 32 to likewise shift vertically along the height of the housing 36, as previously described.

More specifically, the bearing block 208 includes vertical throughbores 258 and 260 at the front and back thereof for receipt of bushings pressfit therein. For guiding up and down movement of the bearing block 208 and thus the clamp head 32, there is a linear guide system including a pair of vertically extending linear guide rods 262 and 264 at the forward region of the housing 36. The bearing block 208 rides up and down on the guide rods 262 and 264 guided by the bushings in the block throughbores 258 and 260.

Figure 22:
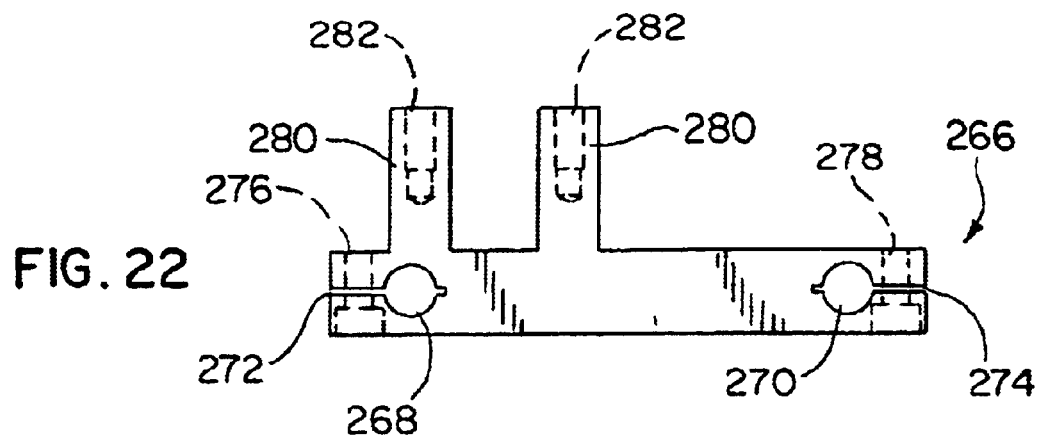
FIG. 22 is an elevation view of one of the mounting brackets for elongate linear guides of the clamp member.
Figure 23A:
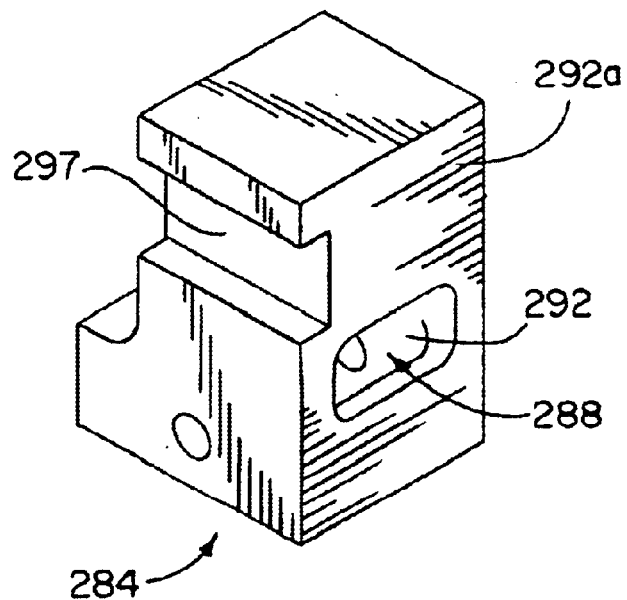
Figure 23B:
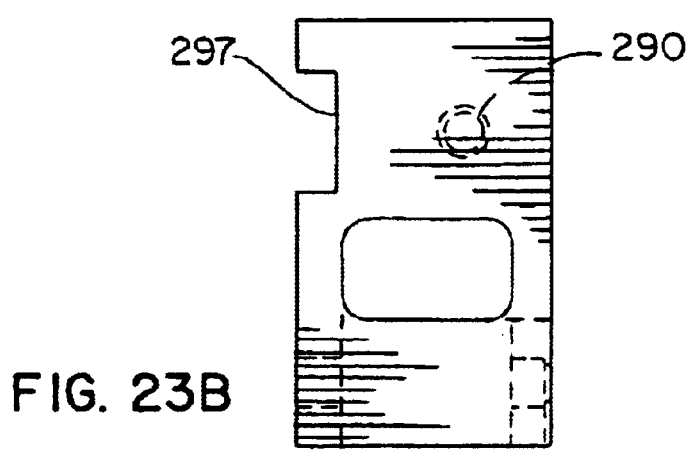
Figure 24B:
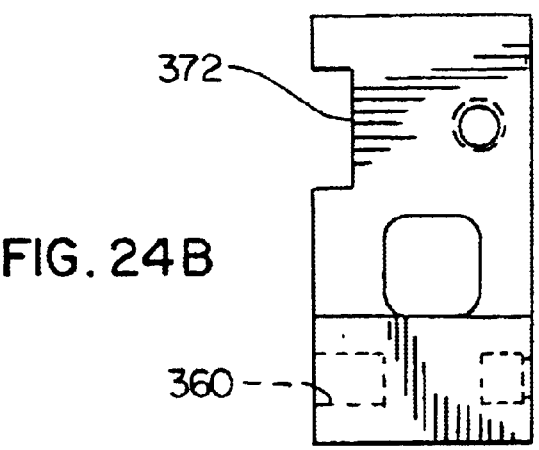
Figure 24C:
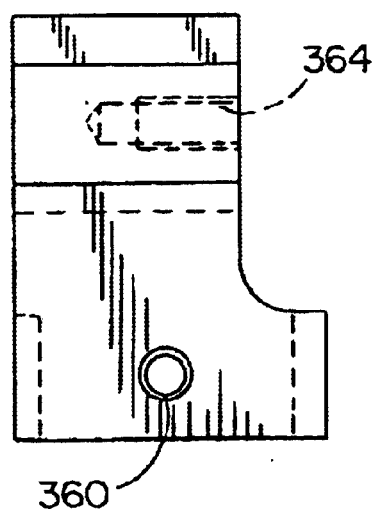
Figure 24D:
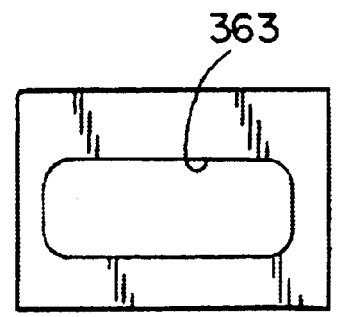

The guide rods 262 and 264 are fixed in place to the support wall 134 by upper and lower bracket holders 266 (FIG. 22). The bracket holders 266 include openings 268 and 270 into which the ends of the opposite ends of the guide rods 262 and 264 are received. The openings 268 and 270 are split via slits 272 and 274, respectively, with these slits 272 and 274 also extending through threaded apertures 276 and 278 of the bracket holders 266. Accordingly, with the ends of the guide rods 262 and 264 received in the openings 268 and 270, threading fasteners into the apertures 276 and 278 will close the slits 272 and 274 clamping the surfaces about the openings 268 and 270 onto the ends of the guide rods 262 and 264 therein securing them in place. The bracket holders 266 include pairs of mounting arms 280 each including threaded bores 282 for being fastened to the support wall 134.

In addition to upper pulleys 250a, 250b and lower pulleys 250c, 250d, a pulley carriage 284 (FIGS. 23A–D) connected to piston rod 286 of the cylinder 68 bracket mounted to wall 134 therebelow has four pulleys, generally designated 250e, rotatably mounted therein. In this regard, the pulley carriage 284 has an internal space 288 in which the pulleys are rotatably mounted on a pin 289 mounted in opposing apertures 290 on either side of the carriage internal space 288 with the pin 289 extending through central bores 250a of the pulleys 250e. The pulleys 250e are vertically aligned between the upper pulley pair 250b and lower pulley pair 250d. The bottom of the carriage 284 has a bore 291 in which the upper end of the piston rod 286 is secured.

An upper window opening 292 in upwardly facing surface 292a and forward window opening 293 in forwardly facing surface 293a of the carriage 284 provide access for the cable 248 into the internal space 288 for being trained about the pulleys 250e therein. As the piston rod 286 is advanced and retracted via selective application of pressurized air into the cylinder 68 through the air lines 128 connected to ports 294 and 296, the connected carriage 284 will likewise advance and retract therewith causing run 248a of the drive cable 248 extending between the pulleys 250a and 250c to travel down and up, respectively. The carriage 284 has a vertical channel slot 297 on its side facing the wall 134 for being guided for its vertical movements by riding along vertical rail 299 attached to the wall 134. As the bearing block 208 is fixed to the cable 248 along the vertical run 248a thereof, the shifting of the pulley carriage 284 causes vertical shifting of the clamp head 32. Accordingly, with the piston rod 286 retracted, the clamp member 32 is retracted upward. Likewise, with the rod 286 advanced, the clamp member 32 is advanced downward.

Due to the use of four horizontally aligned pulleys 250e about which the drive cable 248 is trained, there is a 4:1 drive ratio between movement of the bearing block 208 and connected clamp head 32 and the stroke of the piston rod 286 and connected pulley carriage 284. Because the drive cable 248 has to travel about all four pulleys 250e when the carriage 284 is shifted, the cable 248 travels four times as far as the carriage 284 which generates the 4:1 drive ratio. In the preferred and illustrated form, the maximum stroke of the piston rod 286 is 100 mm such that the 4:1 drive ratio provides a maximum output stroke of the clamp head 32 of approximately 400 mm.

The pulleys 250 preferably have narrow construction in their width between the faces 250b thereof, e.g. 7.1 mm, so that pulleys 250e can be disposed in the internal space 288 of the carriage 284 without necessitating that the carriage width be too large. For example, the illustrated carriage has a width of approximately 50 mm. In this manner, the housing 36 can maintain a narrow width as previously described, while still providing a large stroke for the clamp head 32 to accommodate varying height bundles 12.

The drive cable 248 has a threaded plug and nut assembly 298 at one end and a connector eye 300 at its other end. The ends 298 and 300 of the drive cable 248 are fixed. The end having the threaded plug 298 is fixed adjacent the pulleys 250b by anchor block 302 fastened to the support wall 134 via block apertures 304, as can be seen in FIG. 29. The plug end 298 is screwed down into throughbore 306 of the anchor block 302, as shown in FIG. 10. At the connector eye end 300, the cable 248 is anchored to the housing wall 134 adjacent the pulleys 250d via a fastener, as can be seen in FIG. 10.

Figure 19A:
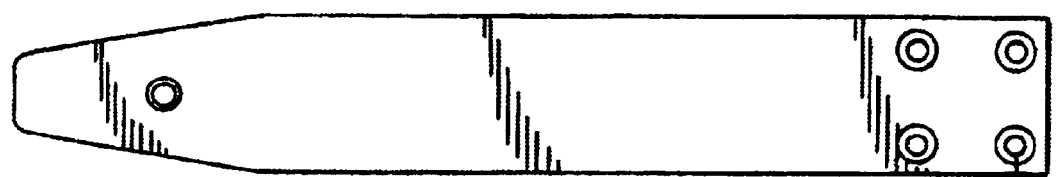
FIGS. 19A and 19B are elevational views of the lower fork member showing a tapered front end portion thereof.
Figure 19B:

The drive system 60 for the fork member 34 is similarly arranged to that of drive system 58. Accordingly, actuation of pneumatic cylinder 70 will cause the cable 228 to travel for advancing and retracting movements of the fork member 34. In the preferred and illustrated form of FIGS. 19A and 19B, the fork member 34 has a flat plate body 308 with a tapered distal end portion 310. The plate body 308 has apertures 312 at the rear thereof. It should be noted that the fork member 34 can take on other configurations than the above-described flat plate construction, such as having a rod-like form. In yet another form, the support member 34 can have a generally Y-shaped configuration with a stem portion at the rear that splits into two forward prong portions for fitting under the bundle 12 on either side thereof. With this Y-shaped fork member, the flexibility provided by being able to laterally adjust individual fork members for varying length signature bundles 12 is reduced. Further, for implementing the Y-shaped fork member, the bottom of the unit 22 would have an open configuration as the split prong portion would be wider than the unit housing 36.

Figure 20A:
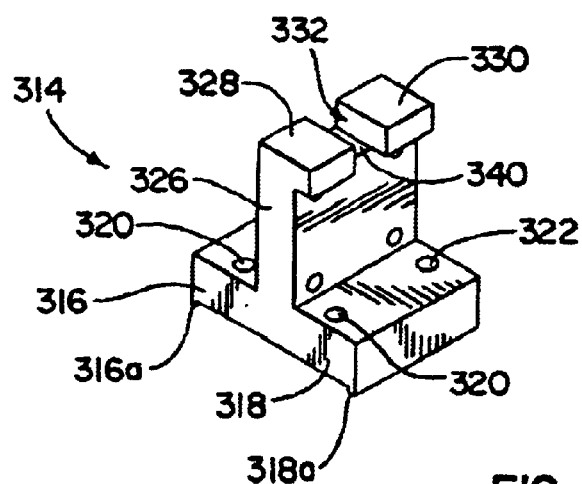
FIGS. 20A–20C are various views of a mounting block showing a lower portion to which the fork member is attached and an upper portion for guiding linear reciprocation of the fork member.
Figure 20B:
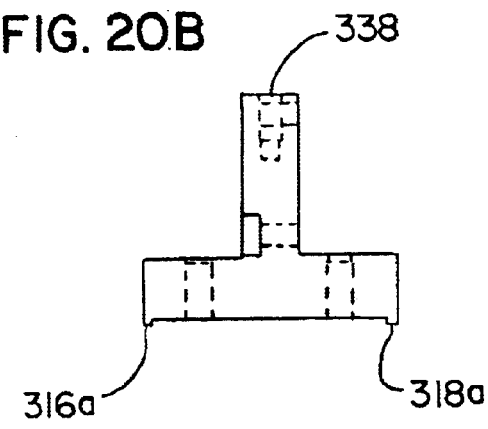
Figure 20C:
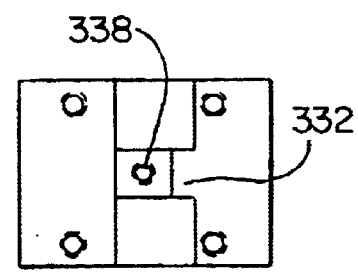

The fork plate 308 is attached to a block plate holder 314, shown in FIGS. 20A–20C. The holder 314 has laterally extending lower portions 316 and 318 each having respective outer ridges 136a and 318a that depend therefrom. The lateral portions 316 and 318 each include rear and forward through apertures 320 and 322.

The blade width across the plate body 308 is only slightly less than that of the width of the housing 36 and is sized to fit tightly between the ridges 316a and 318a of the block holder 314. The apertures 320 and 322 of the holder 314 align with the apertures 312 at the rear of the plate for receiving fasteners therethrough to attach the plate body 308 to the holding block 314.

The fork member 34 is guided for its advancing and retracting movements by a linear guide in the form of rail 324 extending horizontally near the bottom of the housing 36. Thus, for guiding the vertical and horizontal movements of the respective clamp and the fork members 32 and 34, there are transverse and preferably perpendicularly extending linear guides 262, 264 and 324 fixed in the housing 36.

Extending centrally upward from the lateral portions 316 and 318 is an upstanding wall portion 326 of the block holder 314, as best seen in FIG. 28. The top of the wall 326 has a split flanged construction with flanges 328 and 330 on either side of the block holder 314 and extending laterally in one direction from the wall 326. The flanges 328 and 330 cooperate to form a guide slot 332 therebetween. As previously described, the cable 228 for the drive system 60 has two enlarged portion 230, one of which is used to mount the stop 232 thereto. The other cable enlarged portion 230 is captured in the slot 332 along with the guide rail 324 via a retaining plate assembly 334, as seen in FIGS. 10 and 11. The retaining plate assembly 334 is secured via a fastener 336 threaded into a tapped aperture 338 and upper surface 340 of the block holder wall portion 326. Accordingly, as the run 228a of cable 228 travels forward and rearward in the housing 36 due to actuation of the power cylinder 70, the block holder 314 and attached fork plate 334 will likewise advance and retract.

Turning next to a more detailed description of the drive system 60 and referencing FIG. 11, there are two upper pulleys 250f and 250g and three lower pulleys 250h, 250i and 250j about which the cable 228 is routed. The pulleys 250f and 250g are in the upper portion of the housing vertically aligned above the pulleys 250i and 250j in the lower portion of the housing 36 while the pulley 250h is disposed toward the lower, front region of the housing 36.

The cable 228 like the cable 248 includes a threaded plug and nut assembly 342 at one end and an eye connector 344 at the other end thereof. Another anchor block 302 is secured to the housing support side wall 134 at a position between the upper pulley 250f and lower pulley 250i. A slightly different anchor block 346 (FIG. 28) over block 302 is secured to the housing support wall 134 via fastener receiving through apertures 348 formed therein at a position adjacent the lower pulley 250i. A tapped bore 350 is recessed in the end of the anchor block 346 with the connector eye end 344 of the cable 248 clamped thereto by way of fastener 352 screwed into the bore 350, as can be seen in FIG. 10.

Similar to drive system 58, the drive system 60 has a drive ratio provided via a pulley carriage 354 (FIGS. 24A–24D) that rotatably mounts a pair of pulleys generally designated 250k therein. The two pulleys 250k are rotatably mounted in internal space 356 of the carriage 354 on a pin 358 attached in opposing apertures 360 on either side of the space 356 with the pin 358 extending through the central bores 250a of the pulleys 250k. As can be seen in FIG. 11, the pulleys 250k are vertically aligned between the upper pulley 250f and the lower pulley 250i.

An upper window opening 362 and a forward window opening 363 provide the cable 228 access to the pulleys 250k in the carriage space 356 for being trained thereabout. A recessed bore 364 is formed in the upwardly facing surface 366 of the carriage 354. As pneumatic cylinder 70 is bracket mounted to the support wall 134 toward the upper rear region of the housing 36, the lower distal end of piston rod 366 is secured in the bore 364.

Accordingly, as the piston rod 366 is advanced and retracted by way of selective application of pressurized air into the cylinder 70 via the air lines 128 connected to ports 368 and 370 of the cylinder 70, the connected carriage 354 will likewise advance and retract therewith causing the run 228a of the drive cable 228 extending between the pulleys 250h and 250j to travel rearwardly and forwardly, respectively. The carriage 354 has a vertical slot channel 372 formed in the side thereof facing the support wall 134 for being guided for its vertical movements by vertical rail 374 attached to the wall 134. With the run 228a of the cable 228 fixed to the block holder 314, shifting of the pulley carriage 354 causes the attached fork member 34 to shift horizontally. Accordingly, with the piston rod 366 advanced, the support member 34 will be retracted, whereas with the piston rod 366 retracted, the support member 34 will be advanced.

Due to the use of two pulleys 250k about which the drive cable 228 is trained, there is a 2:1 drive ratio between movement of the block holder 314 and connected support member 34 and the stroke of the piston rod 366 and connected pulley carriage 354. In the preferred and illustrated form, the maximum stroke of the piston rod 366 is 125 mm such that the 2:1 drive ratio provides a maximum output stroke of the support member 34 of approximately 250 mm. Also, since the pulley carriage 354 only has two pulleys 250k that it mounts, it can be even thinner than the pulley carriage 284 such as on the order of approximately 43 mm thick. Again, this assists in keeping the narrow dimension of the housing 36 to a minimum.

Referring again to the diagram of FIG. 13A, a primary air supply line 376 is shown that selectively provides high pressure air to the pneumatic cylinders 68 and 70 through the valves 129 operated by the push buttons 126. The push buttons 126 are provided on the four box housings 118–124 having the valves 129 therein and through which air lines 128 are directed and which receive pressurized air from the main supply line 376. The box housings 118–124 are divided into a pair of upper box housings 118 and 120 and a pair of lower box housings 122 and 124. The control buttons 126 on each one of the upper set of the box housings 122 and 124 work in tandem, while the control buttons 126 on each one of the lower set of box housings 122 and 124 work in tandem. In other words, pushing a control button 126 on box housing 118 will not supply pressurized air as desired unless the corresponding push button 126 on box housing 120 is simultaneously depressed.

As previously described, these box housings 118–124 are adjacent the vertical handles 196 and 198 which the operator uses when positioning the apparatus 10. This allows the operator to keep their hands on the handles portions 96 and 98 while actuating the desired push buttons 126. Because the push buttons 126 will only work in tandem in either the upper set or lower set of box housings 118–124, this arrangement encourages an operator to keep both hands on the handle portions 96 and 98 when maneuvering the apparatus 10, and thus improves the safety in its operation.

In each of the sets of box housings 118, 120 and 122, 124, the ordering of the buttons 126 in terms of the operations of the clamp and fork members 32 and 34 that they control is the same. The top two buttons 126 in each set 118, 120 and 122, 124 are operable to cause the clamp and fork members 32 and 34 of the pair of leftmost units 22a, 22b, when viewed from the rear of the apparatus 10, to retract. Accordingly, when an operator pushes both of the topmost buttons 126a in either of the box housing sets 118, 200 or 122, 124, the power cylinder 68 and 70 are supplied with pressurized air so that they coordinate the retracting movements of the clamp and fork members 32 and 34 of the units 22a and 22b. It is desirable for the downward clamping pressure applied by the clamp members 32 to be maintained while the fork members 34 are being withdrawn from under the bundles 12 to maintain their stability during bundle drop-off operations. To this end, pushing the buttons 126a preferably only raises the clamp members 32 to release the clamping engagement they had on the bundle 12 after the fork members 22a and 22b are withdrawn from beneath the bundle 12 so that it is securely placed at its deposit location.

The buttons 126b in the row immediately below the top row buttons 126a are operable to cause the clamp and fork members 32 and 34 of all of the units 22a–22d to retract. Accordingly, when an operator pushes both of these buttons 126b in either the upper set of boxes 118, 120 or lower set of boxes 122, 124, air will be supplied to the power cylinders 68 and 70 of all of the units 22a–22d so that the above-described coordinated retraction of the clamp and fork members 32 and 34 occurs. Where the operator has first deposited the bundle 12 carried by the leftmost units 22a, 22b, the buttons 126b will be operable to retract the clamp and fork members 32 and 34 of the rightmost units 22c and 22d. On the other hand, where the operator would like to deposit both bundles 12 simultaneously, they can simply depress the buttons 126b of either of the box housing sets 118, 120 or 122, 124.

Immediately below the buttons 126b are buttons 126c operable to advance the clamp members 32, and immediately below these buttons 126c are buttons 126d that are operable to advance the fork members 34. When an operator simultaneously depresses the buttons 126c of either box housing set 118, 120 or 122, 124, the clamp members 32 of all of the units 22a–22d will be lowered into clamping engagement with the bundles 12 supported on the advanced fork members 34. To advance the fork members 34, the buttons 126d of either box housing set 118, 120 or 122, 124 are simultaneously depressed. Operation of the control buttons 126c and 126d causes pressurized air to be supplied to the power cylinders 68 and 70 of the units 22 to generate advancing movements of the clamp and fork members 32 and 34.

As previously described, the valving circuit 74 of the load balancing system 72 allows an operator to easily maneuver the apparatus 10 so that they can rapidly carry and deposit bundles 12 in a wide range of pallet patterns with low cycle times. The valving circuit 74 allows the operator to calibrate the lift force provided by the lift cylinder 75 to the apparatus 10 based on the weight of the bundles 12 that is being handled via pressure regulators 378, 380 and 382.

For calibrating the lifting force, there is an initial set up stage of the apparatus 10. First, the operator adjusts the so-called "no-load" pressure regulator 378 at the manipulator 20 prior to pick-up of bundles 12 with the apparatus 10. The pressure regulator 378 governs the minimum amount of air pressure supplied to the lifting cylinder 75 at the manipulator 20 for keeping the weight of the apparatus 10 felt by the operator to a minimum for "weightless" operation and manipulation thereof. Before the no-load regulator 378 is adjusted as set forth above, both regulators 380 and 382 are adjusted to their minimum airflow positions so that the minimum amount of air pressure is allowed therethrough. Accordingly, with the regulators 378–382 set up so that the "empty" apparatus 10 essentially feels weightless to the operator in a no-load operation mode, they will easily be able to maneuver the apparatus 10 to the bundle pick-up location 15 in a rapid manner.

Once at the pick-up location 15, the operator slows the movement of the apparatus 10 and orients it so that the bottoms of the units 12 including the vertical position of the fork members 34 therein are slightly below the raised bundles 12. The operator then presses the buttons 126d operating associated valves 129a and 129b which causes the fork members 34 to advance under the bundles 12. It is preferred that the fork valves 129a and 129b be constructed and configured to cause the fork members 34 to retract more quickly when buttons 126a are actuated than they are advanced when buttons 126d are actuated for enhanced bundle drop-off operations and safety in bundle pick-up operations. Accordingly, the power actuator or cylinder 70 for the fork member 34 will have a fast retracting stroke and a slower advancing stroke.

After advancing the fork members 34 under the bundles 12, the buttons 126c are pushed so that the clamp members 32 advance downward into clamping engagement with the top of the bundles 12 so that they are gripped tightly between the clamp members 32 on top of the bundles 12 and the fork members 34 disposed below the bundles 12. For the push buttons 126c to be enabled for operating associated valves 129c and 129d, the bundle sensor 76 must detect the presence of bundles 12 in position to be gripped by the apparatus 10. For this purpose, the bundles sensor 76 can be in the form of a microswitch unit 384 that is mounted to the front wall 38 of each of the gripping units 22 between the transverse slot openings 64 and 66 thereof so that a switch actuator or plunger (not shown) projects forwardly from the wall. As the operator maneuvers the apparatus 10 into position for gripping of the bundles 12 at the pick-up location 15, the front walls 38 of the units 22 will be brought into engagement with the rear, long edge of the bundles 12 depressing the switch plunger. The switch 384 then signals a controller such as a PLC which enables the valves 129c and 129d.

Valve 129e governs airflow from the regulators 380 and 382 to the lift cylinder 75. As the pressurized air from the regulators 380 and 382 will be set to be greater than that provided by the no-load pressure regulator 378, the sensor switch 76 provides a safety feature in that the airflow from either regulator 380 or 382 is not communicated to the cylinder 75 absent the detection of the presence of the bundles 12 and the operation of the clamps 32 advanced into engagement therewith. Thus, once the switch 384 signals the PLC to enable the operation of valves 129c and 129d by the buttons 126c, the PLC also shifts the valve 129e so that pressurized air from the so-called "two-bundle" pressure regulator 380 is supplied to the lift cylinder 75 in response to signaling from operator actuation of control buttons 126c. In this way, if a bundle 12 is not properly positioned for pick-up, an operator can not cause the clamp member 32 to advance and at the same time create a lift force that is greater than needed, e.g. approximately one-hundred pounds of extra force where fifty pound bundles are being handled, requiring the operator to exert a downward force on the apparatus 10 for keeping it at its desired level.

Continuing in the set-up stage, once the clamp members 32 are clamped onto the bundles 12 by operation of the buttons 126c, the operator adjusts the regulator 380 until the apparatus 10 carrying the two bundles 12 therewith is at a comfortable weight for being maneuvered. At this time, the apparatus 10 is in its two-bundle mode of operation and the operator can rapidly move the now weightless apparatus 10 with the two bundles 12 to their deposit location.

Where the bundles 12 are to be deposited independently of each other, the operator slows down the weightless apparatus 10 and maneuvers it so that the bundle 12 carried by the left set of units 22a and 22b is properly oriented for placement at its deposit location with the same ease as the empty apparatus 10 is maneuvered. The operator then depresses push buttons 126a to deposit the bundle 12 carried by the units 22a and 22b. At this time, the PLC switches the valve so that it allows airflow to the lift cylinder 75 through the so-called "one-bundle" pressure regulator 382 instead of pressure regulator 380 based on signaling from operator actuation of the button controls 126a. The operator then adjusts the regulator 382 to accommodate for the reduced weight of the apparatus 10 carrying the single bundle 12 with the right units 22c and 22d so that the force and weight felt by the operator is kept to a minimum. Accordingly, the air pressure supplied to the lift cylinder 75 is at its minimum when governed by the pressure regulator 378 and is at its maximum when governed by the regulator 380. The pressure supplied to the lift cylinder 75 is intermediate the pressures as controlled by regulators 378 and 380 when it is supplied by the regulator 382. For example, with fifty pound bundles 12, the lift force provided by the cylinder 75 via regulator 380 will be approximately one-hundred pounds greater than that provided via regulator 378, and fifty pounds greater than that provided via regulator 382.

With the regulator 382 adjusted to the operator's preference, the apparatus 10 is in its one-bundle mode of operation and is then maneuvered so that the bundle 12 carried by the right units 22c and 22d is in proper orientation for placement at its deposit location. At that time, the operator depresses the buttons 126b for depositing the bundle 12. Operator actuation of the button controls 126b causes airflow to bypass the regulators 380 and 382 and flow through regulator 378 which has already been calibrated for the weight of the apparatus 10 less the bundles 12, as previously described. From this point on, the apparatus 10 can be utilized to handle the bundles 12 it has been calibrated for in the setup stage in a weightless fashion. The apparatus 10 should be readjusted as set forth above for each new job as bundle size and weight changes.

Figure 13B:
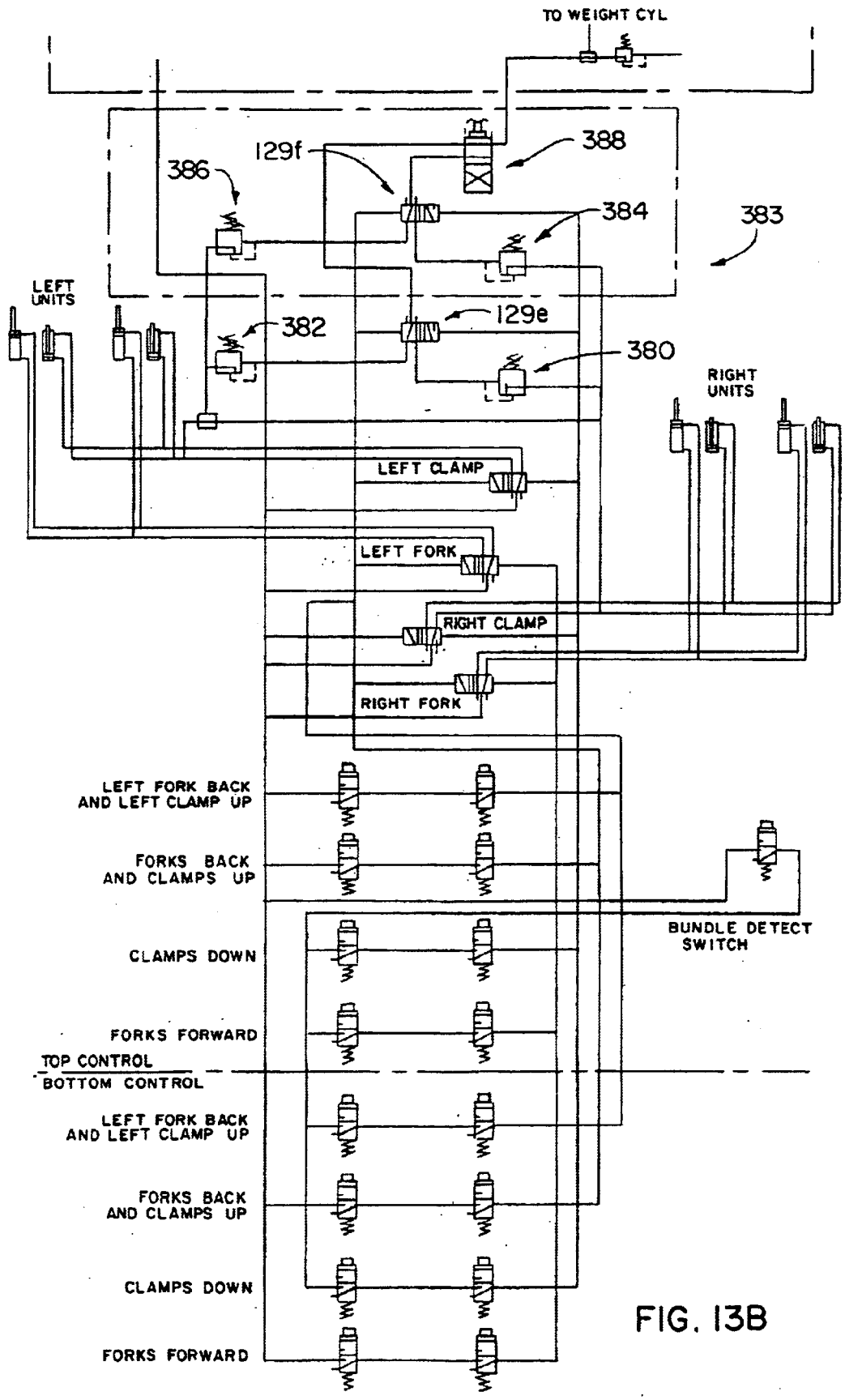

One of the advantages the present apparatus 10 provides is the ability for a single operator to service more than one stacker. This can be of particular importance where a high throughput rate is not necessarily occurring off of the stacker(s) that would otherwise make it difficult to justify the high capital investment in bundle gripping equipment such as the ago present apparatus 10. To this end, where the stackers are creating bundles 12 of differing weights, the apparatus 10 can include an alternative valving circuit 383 (FIG. 13B) so that the lifting force applied by the lifting cylinder 75 is adjusted depending on the stacker from which the bundles are picked-up.

As shown, the valving circuit 383 is similar to the valving circuit 74 of FIG. 13A but adds another set of pressure regulators 384 and 386 that need to be calibrated for the differently weighted bundles from the second stacker. These pressure regulators feed air through an additional valve 129f that controls flow to the lifting cylinder 75. Further, flow through both the valves 129e and 129f is directed to a manually operated valve 388 which allows an operator to select between the regulator sets 380, 382 and 384, 386.

Thus, after a operator has set-up the regulators 380 and 382 for an initial weight of bundles 12 created by a first stacker, they use the regulators 384 and 386 to set-up the apparatus 10 for handling the differently weighted bundles 12 from the second stacker. Thereafter, depending on which stacker the bundles 12 are picked-up from, the operator actuates the valve 388 to switch to the appropriate regulator set 380, 382 or 384, 386. In this way, the lifting force applied to the apparatus 10 is tailored to keep it substantially weightless to the operator regardless of the change in bundle weight from one stacker to another.

Referring next to FIGS. 32A–32D, a conveyor table 390 for taking bundles formed in a stacker 391 (FIG. 1) and transporting them to the bundle pick-up location 15 is shown. The table conveyor 390 has the stacker 391 at its upstream end from which it recesses stacks of signatures formed into bundles 12 and conveys them downstream on cylindrical rollers 392 to the opposite end of the table 390 at which the bundle pick-up location or area 15 is provided.

The table 390 operates for conveying the bundles 12 downstream as a "slip-torque" table such as disclosed in the U.S. Pat. No. 3,951,255. Accordingly, the cylindrical rollers 392 are loosely and rotatably mounted on driven shafts 394 that extend normal to the downstream travel direction of the bundles 12 on the table 390. A motor 396 under the table drives a main drive shaft 398 that extends for substantially the length of the table 390. The drive shaft 398 rotates the driven shafts 394 via takeoff belts 400 wrapped around the drive shaft 398 and twisted into somewhat of a figure eight orientation for being trained around pulleys (not shown) on ends of the roller shafts 394. In this manner, the single drive shaft 398 rotates each of the driven roller shafts 394.

Frictional contact between the loose fitting rollers 392 on their associated driven shafts 394 causes the rollers 392 to rotate so that the bundles 12 thereon are transported downstream to the pick-up location 15 at the end of the table 390. However, when the downward force on the rollers 392 is sufficiently great such as when the bundles 12 are positively stopped, the rollers 392 will no longer rotate as the downward force is sufficient to overcome the frictional contact between the driven shafts 394 and the loosely fitting rollers 392 thereon.

Figure 32A:
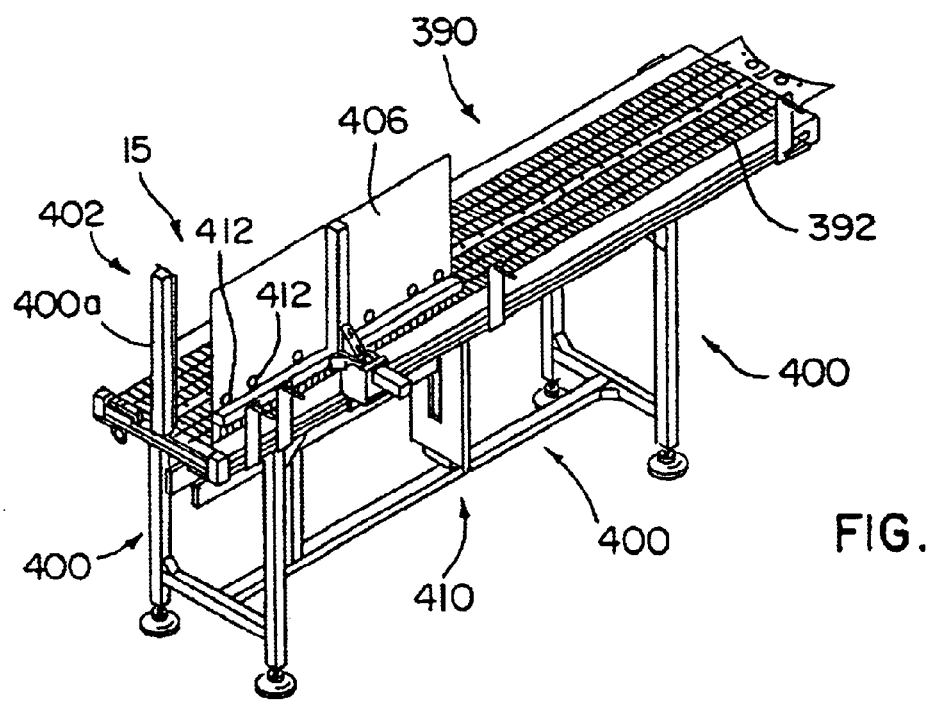
FIGS. 32A–32D are various views of the conveyor table for delivering the bundles from a stacker to the bundle pick-up location at the end of the conveyor showing a slip torque roller system and a lifting mechanism beneath the table for raising the bundles over the conveyor rollers for pick-up.
Figure 32B:
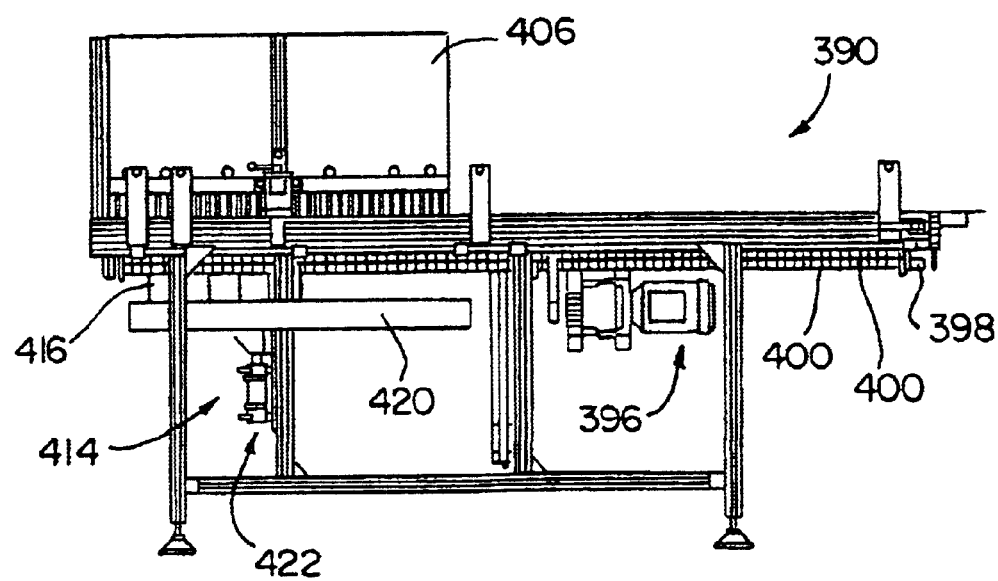
Figure 32C:
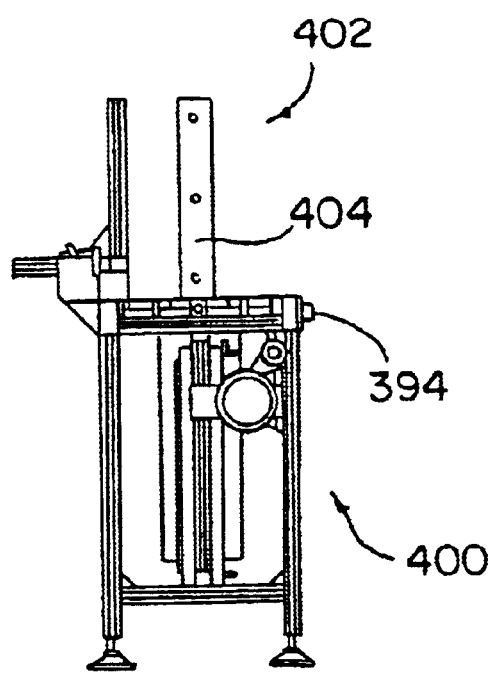

The table 390 includes frame members generally designated 400 for floor mounting the table and supporting the driven shafts 394 spaced above ground level. A fixed bundle stop 402 is provided at the end of the table 390 at the bundle pick-up location 15. As best seen in FIGS. 32A and 32C, the bundle-stop 402 can be an extension of one of the frame members 400*a* that projects upwardly beyond the tops of the rollers 392. The bundle-stop 402 can include an elongate plate 404 fixed to the frame member 400*a* to face upstream and which abuts against the forwardmost bundle 12 in the pick-up area 15. As can be seen in FIG. 1, the height of the bundle-stop 402 including the attached plate 404 is such that it will engage the bundle 12 for the full height thereof.

A guide plate 406 is also fixed in position relative to the table 390 and extends longitudinally along the bundle travel direction on one side of the table 390 generally at the pick-up location 15 provided thereon. The guide plate 406 can be adjusted via handle and guide assembly 407 for different widths of bundles 12 laterally across the table 390. A plurality of bundle sensors 408 are provided at predetermined positions along the length of the table 390 for counting the number of bundles 12 that pass a particular sensor and detecting the presence or absence of bundles at the sensor location.

More specifically, another bundle-stop 410 is provided at an intermediate position along the length of the table 390 slightly upstream of the bundle pick-up area 15 and the guide plate 406. The bundle stop 410 is mounted for translation from a position beneath the table as shown to an operative, raised position where it is shifted between adjacent rows of rollers 392 to project above the table 390 preventing further bundles 12 from entering the downstream pick-up area 15 of the table 390. Accordingly, the sensors 408 can include an optical sensor 408*a* which signals a controller such as a PLC as to each passing bundle 12 so that it can count the number of bundles 12 that pass the position of the sensor 408*a* on the table 390. Once the sensor 408*a* has counted two bundles, the controller signals a power actuator to shift the bundle stop 410 to its raised position.

Figure 32D:
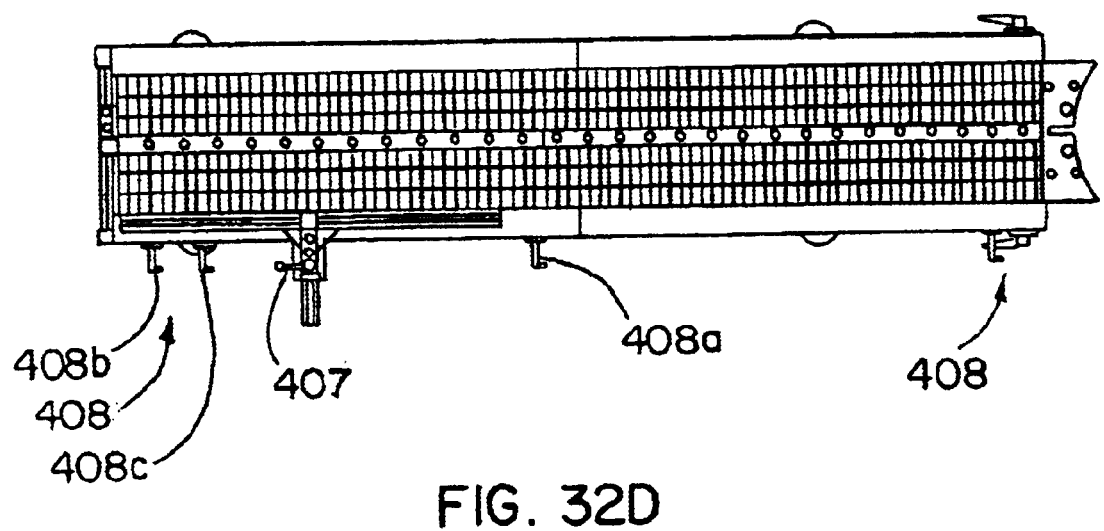

The guide plate 406 is provided with apertures 412 with a pair of sensors 408*b* and 408*c* mounted to be aligned with two of the apertures 412 behind the guide plate 406, as can be seen best in FIGS. 32A and 32D. These sensors 408*b* and 408*c* signal the controller with information as to the presence or absence of bundles 12 across therefrom on the table 390 in the pick-up area 15.

A lifting mechanism generally designated 414 is mounted beneath the table 390 below the pick-up area 15. The lifting mechanism 414 includes a plurality of plates 416 that can be aligned to fit between adjacent rows of rollers 392. The plates 416 have a lowered position where they are below the table as shown, and a raised position where they are shifted to project above the table 390 for raising the bundles 12 in the bundle pick-up area 15 above the table 390 and off the rollers 392 so that the fork members 34 of the bundle gripping units 22 can be advanced thereunder. FIG. 1 shows the bundles 12 and lifting plates 416 in their raised position with gaps 418 formed between the bottoms 88 of the bundles 12 and the rollers 392, and between adjacent plates 416.

More particularly, the plates 416 are mounted to a common mounting bar 420 that extends longitudinally under the table 390. The position of the plates 416 along the length of the mounting bar 420 can be adjusted based on the size of the bundles 12, and in particular the length thereof so that a pair of the plates 416 when shifted to their raised position preferably will be substantially equally spaced from the center of the bundle 12 and close to the ends thereof to minimize bundle drooping.

Like the stop plate 410, the mounting bar 420 is shifted by a power actuator in the form of cylinder 422. The controller actuates the cylinder 422 for raising the bar 420 when it received signals from the sensors 408*b* and 408*c* indicating the presence of a pair of bundles 12 in the table pick-up area 15. After the apparatus 10 has obtained custody over the bundles 12 in the pick-up area 15, the sensors 408*b* and 408*c* will signal the controller as to the absence of the bundles in the pick-up area 15. In response, the controller causes the cylinder 422 to actuate for retracting and lowering the mounting bar 420 and retracting and lowering the bundle stop 410 to allow the next two bundles 12 into the bundle pick-up area 15.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

We claim:

1. A unit for gripping and transporting bundles of signatures having small sizes or large size signatures in use with other units, the bundle gripping unit comprising:

a housing;

a lower support member and an upper clamp member each having a retracted position for releasing bundles from the lower support and upper clamp members, and the lower support member and upper clamp member each having an advanced position in which the lower support member and upper clamp member cooperate with each other to support bundles for transport of the bundles; and adjustment controls of the support and clamp members for adjusting the position of the members to allow the members to be disposed closer to the housing for small size signature bundles and extended further from the housing for larger size signature bundles to minimize distances bundles project beyond the lower support member, the upper clamp member shifting in a first direction between the retracted position and the advanced position thereof, and in a second direction transverse to the first direction when adjusting the position of the upper clamp member closer to or further from the housing.

2. The bundle gripping unit of claim 1 wherein the housing has a top and bottom, the upper clamp member includes a clamping head and the lower support member includes a flat plate, and the upper clamp member is external and adjacent the top of the housing in the retracted position of the upper clamp member and the flat plate of the lower support member is adjacent the bottom of and completely in the housing in the retracted position of the lower support member to minimize interference with bundles during pickup and depositing of bundles.

3. A unit for gripping and transporting bundles of signatures having small sizes or large size signatures in use with other units, the bundle gripping unit comprising:

a housing:

a lower support member and an upper clamp member each having a retracted position for releasing bundles from the lower support and upper clamp members, and the lower support member and upper clamp member each having an advanced position in which the lower support member and upper clamp member cooperate with each other to support bundles for transport of the bundles; and adjustment controls of the support and clamp members for adjusting the position of the members to allow the members to be disposed closer to the housing for small size signature bundles and extended further from the housing for larger size signature bundles to minimize distances bundles project beyond the lower support member, wherein the adjustment control of the lower support member includes a user operated control member and a scale external of the housing, the scale including indicia generally corresponding to the distance from the housing to which the support member will extend with the control member shifted along the scale to select the desired distance based on signature size.

4. The bundle gripping unit of claim 3 wherein the lower support member includes a cable drive system for shifting the support member between the retracted and advanced positions thereof, the control member includes an abutment in the housing and the cable drive system includes a stop which cooperates with the abutment to limit travel of the support member to the extended position thereof.

5. A unit for gripping and transporting bundles of signatures having small sizes or large size signatures in use with other units, the bundle gripping unit comprising:

a housing;

a lower support member and an upper clamp member each having a retracted position for releasing bundles from the lower support and upper clamp members, and the lower support member and upper clamp member each having an advanced position in which the lower support member and upper clamp member cooperate with each other to support bundles for transport of the bundles; and adjustment controls of the support and clamp members for adjusting the position of the members to allow the members to be disposed closer to the housing for small size signature bundles and extended further from the housing for larger size signature bundles to minimize distances bundles project beyond the lower support member, wherein the adjustment control of the upper clamp member includes an extendable slide bar having a clamping head mounted thereto for being shifted from positions closer to the housing to positions extended further therefrom, and the slide bar includes a releasable lock for fixing the bar against sliding with the clamping head at a desired extended position based on signature size.

6. A unit for gripping and transporting bundles of signatures having small sizes or large size signatures in use with other units, the bundle gripping unit comprising:

a housing:

a lower support member and an upper clamp member each having a retracted position for releasing bundles from the lower support and upper clamp members, and the lower support member and upper clamp member each having an advanced position in which the lower support member and upper clamp member cooperate with each other to support bundles for transport of the bundles; and adjustment controls of the support and clamp members for adjusting the position of the members to allow the members to be disposed closer to the housing for small size signature bundles and extended further from the housing for larger size signature bundles to minimize distances bundles project beyond the lower support member, wherein the upper clamp member includes a clamp head and a universal pivot mount therefor to allow the clamp head to clamp flush against bundles having an uneven build-up of signatures therein.

7. A compact unit for transporting signatures stacked into bundles, the unit comprising:

a housing having an internal space and further including a top and bottom defining a predetermined housing height, a front and a back defining a predetermined housing depth, opposite sides defining a predetermined housing width with the width being significantly smaller than the housing height and depth so that the housing is very narrow in the widthwise direction;

an upper clamp member and a lower support member having advanced positions in which the members cooperate to engage respectively uppermost and lowermost signatures in a bundle for clamping the bundle therebetween external of the housing, and retracted positions for release of the clamped bundles;

transverse linear guides for the clamp member and support member to guide linear sliding movement of the members between the retracted and advanced positions thereof with the upper clamp member shifting transverse to the lower support member for clamping the bundles therebetween; and power actuators in the internal space of the housing operable to provide the clamp and support members with a variable range of travel between the retracted and advanced positions thereof for secure clamping of bundles of different sized signatures.

8. The unit of claim 7 wherein the clamp member includes a clamp head and the lower support includes an elongate flat plat, and the clamp head travels along the height of the housing between the retracted and advanced positions thereof and the flat plate travels out from the bottom of the housing in the direction of the housing depth.

9. The unit of claim 8 wherein the elongate flat plate is slightly shorter than the housing depth and narrower than the housing width so that the plate is retracted entirely within the bottom of the housing.

10. A compact unit for transporting signatures stacked into bundles, the unit comprising:

a housing having a top and bottom defining a predetermined housing height, a front and a back defining a predetermined housing depth, opposite sides defining a predetermined housing width with the width being significantly smaller than the housing height and depth so that the housing is very narrow in the widthwise direction;

an upper clamp member and a lower support member having advanced positions in which the members cooperate to engage respectively uppermost and lowermost signatures in a bundle for clamping the bundle therebetween, and retracted positions for release of the clamped bundles;

transverse linear guides for the clamp member and support member to guide linear sliding movement of the members between the retracted and advanced positions thereof with the upper clamp member shifting transverse to the lower support member for clamping the bundles therebetween; and power actuators in the housing operable to provide the clamp and support members with a variable range of travel between the refracted and advanced positions thereof for secure clamping of bundles of different sized signatures, wherein one of the power actuators has a fast stroke for retracting movement of the support member to minimize the pull on lowermost bundle signatures during bundle depositing operations, and has a slower stroke for advancing movement of the support member to minimize bundle damage during bundle pick-up operations.

11. A compact unit for transporting signatures stacked into bundles, the unit comprising:

a housing having a top and bottom defining a predetermined housing height, a front and a back defining a predetermined housing depth, opposite sides defining a predetermined housing width with the width being significantly smaller than the housing height and depth so that the housing is very narrow in the widthwise direction;

an upper clamp member and a lower support member having advanced positions in which the members cooperate to engage respectively uppermost and lowermost signatures in a bundle for clamping the bundle therebetween, and retracted positions for release of the clamped bundles;

transverse linear guides for the clamp member and support member to guide linear sliding movement of the members between the retracted and advanced positions thereof with the upper clamp member shifting transverse to the lower support member for clamping the bundles therebetween;

power actuators in the housing operable to provide the clamp and support members with a variable range of travel between the retracted and advanced positions thereof for secure clamping of bundles of different sized signatures, wherein the power actuators include fluid cylinders, and cables and pulleys between the cylinders and members, and pulley carriages each having a plurality of pulleys mounted thereto about which the associated cable extends with the carriages driven by operation of the cylinders to provide the members with a greater amount of travel than the travel of the driven carriages carrying multiple pulleys to keep the housing compactly sized while maximizing the range of travel for the support and clamp members.

12. The unit of claim 11 wherein the cylinders drive the carriages vertically between the top and bottom of the housing, and the pulleys and cables are arranged to cooperate to keep the height of the housing only slightly greater than a maximum height of the bundles to be clamped between the clamp and support members and the width of the housing only slightly greater than that of the carriages carrying the multiple pulleys therewith.

13. A bundle gripping apparatus for transporting signatures stacked into bundles, comprising:

a bundle gripping unit having:

a lower support having a predetermined length for fitting under a bundle to be transported;

an upper clamp head having an upper retracted position spaced from the bundle and a lowered advanced position for tightly engaging an upper surface of the bundle and clamping the bundle between the clamp head and lower support thereunder;

a universal pivot mount of the clamp head that allows the advanced clamp head to pivot and self-adjust for keeping the clamp head in flush engagement with the bundle upper surface despite sloping of the upper surface; and a drive for the clamp head that linearly shifts the clamp head between the retracted and advanced positions thereof substantially normal to the length of the lower support.

14. The bundle gripping unit of claim 13 including hanger members and a support rail from which the hanger members support a gripping unit with the rail having a predetermined length sized to allow multiple bundle gripping units to be adjustably mounted to the rail for handling one or more bundles, the gripping units being spaced from each other along the rail based on bundle size and number of bundles to be simultaneously handled.

15. The bundle gripping unit of claim 13 wherein the clamp head includes a disc-shaped member.

16. The bundle gripping unit of claim 15 wherein the clamp member has a predetermined small size, and an adjustable mounting member to which the small clamp member is attached for allowing the clamp head to be positioned at different extended positions for substantially central engagement with respect to the bundle to maximize the distribution of clamping forces provided by the clamp head throughout the bundle.

17. The bundle gripping unit of claim 16 wherein the lower support member has a retracted position with support member withdrawn from under the bundle and a plurality of user-selectable advanced positions based on size of the bundle to be supported thereby.

18. A bundle gripping apparatus for transporting signatures stacked into bundles, comprising:

a bundle gripping unit having:

a lower support having a predetermined length for fitting under a bundle to be transported;

an upper clamp head having an upper retracted position spaced from the bundle and a lowered advanced position for tightly engaging an upper surface of the bundle and clamping the bundle between the clamp head and lower support thereunder; and a pivot mount of the clamp head that allows the advanced clamp head to pivot and self-adjust for keeping the clamp head in flush engagement with the bundle upper surface despite sloping of the upper surface, the pivot mount includes a ball joint to allow for universal pivoting of the clamp head.

* * * * *